(12) United States Patent
Krivenkov et al.

(10) Patent No.: US 12,447,881 B2
(45) Date of Patent: Oct. 21, 2025

(54) ARMREST ELEMENT

(71) Applicant: GRAMMER Aktiengesellschaft, Ursensollen (DE)

(72) Inventors: Konstantin Krivenkov, Amberg (DE); Rohansinh Komalsinh Solanki, Maharashtra (IN); Hariom Anantrao Thakare, Maharashtra (IN); Shiju Surendran, Kerala (IN); Sagar Rambhau Mete, Maharashtra (IN)

(73) Assignee: GRAMMER Aktiengesellschaft, Ursensollen (DE)

( * ) Notice: Subject to any disclaimer, the term of this patent is extended or adjusted under 35 U.S.C. 154(b) by 265 days.

(21) Appl. No.: 18/306,565

(22) Filed: Apr. 25, 2023

(65) Prior Publication Data

US 2023/0356638 A1    Nov. 9, 2023

(30) Foreign Application Priority Data

May 4, 2022 (DE) .................... 10 2022 110 960.7

(51) Int. Cl.
*B60N 2/75* (2018.01)
(52) U.S. Cl.
CPC ...................................... *B60N 2/79* (2018.02)
(58) Field of Classification Search
CPC .......... B60N 2/787; B60N 2/79; B60N 2/797; B60N 2/793
See application file for complete search history.

(56) References Cited

U.S. PATENT DOCUMENTS

| | | | | |
|---|---|---|---|---|
| 5,284,314 A * | 2/1994 | Misaras | ................. | B60N 3/102 297/188.17 |
| 7,258,381 B2 * | 8/2007 | Sturt | ......................... | B60R 7/04 296/37.7 |
| 8,061,671 B2 * | 11/2011 | Mahaffy | ................. | B60N 2/79 248/222.12 |
| 8,979,190 B2 * | 3/2015 | Madrigal | ............... | A47C 7/705 297/161 |
| 9,840,826 B2 * | 12/2017 | Huber | .................... | B60K 35/20 |
| 10,259,356 B2 * | 4/2019 | Lehman | ................. | B60N 3/103 |

(Continued)

FOREIGN PATENT DOCUMENTS

| | | |
|---|---|---|
| DE | 69906461 | 10/2003 |
| DE | 102012010666 | 12/2013 |
| DE | 102020110772 | 4/2021 |

OTHER PUBLICATIONS

Official Action (no English translation available) for Germany Patent Application No. 102022110960.7, dated Sep. 28, 2022.
(Continued)

*Primary Examiner* — Philip F Gabler
(74) *Attorney, Agent, or Firm* — Sheridan Ross P.C.

(57) ABSTRACT

The invention relates to an armrest element of a seat, in particular of a vehicle seat, having a base body, the armrest element having at least one first connection interface of predetermined design to which at least one exchangeable extension module having a second connection interface of predetermined design can be fixed, the first connection interface and the second connection interface being designed in such a way that at least one detent connection is made possible between the first connection interface and the second connection interface.

12 Claims, 18 Drawing Sheets

(56) References Cited

U.S. PATENT DOCUMENTS

| | | | | |
|---|---|---|---|---|
| 10,939,765 | B1* | 3/2021 | Reily | A47C 7/54 |
| 11,103,095 | B2* | 8/2021 | Martinez | A47G 23/0641 |
| 2022/0160132 | A1* | 5/2022 | Walter | A47C 7/546 |
| 2023/0356638 | A1* | 11/2023 | Krivenkov | B60N 2/767 |
| 2023/0356639 | A1* | 11/2023 | Krivenkov | B60N 2/24 |

OTHER PUBLICATIONS

Official Action (no English translation available) for Germany Patent Application No. 102022110960.7, dated Sep. 16, 2025, 7 pages.

* cited by examiner

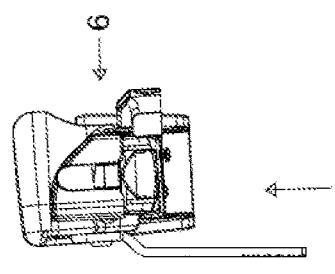
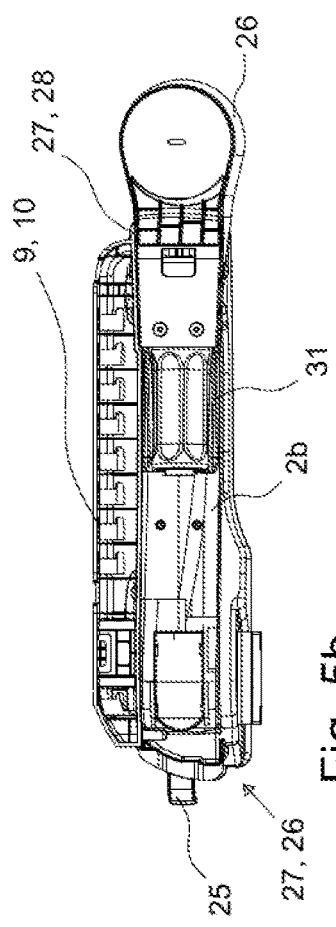
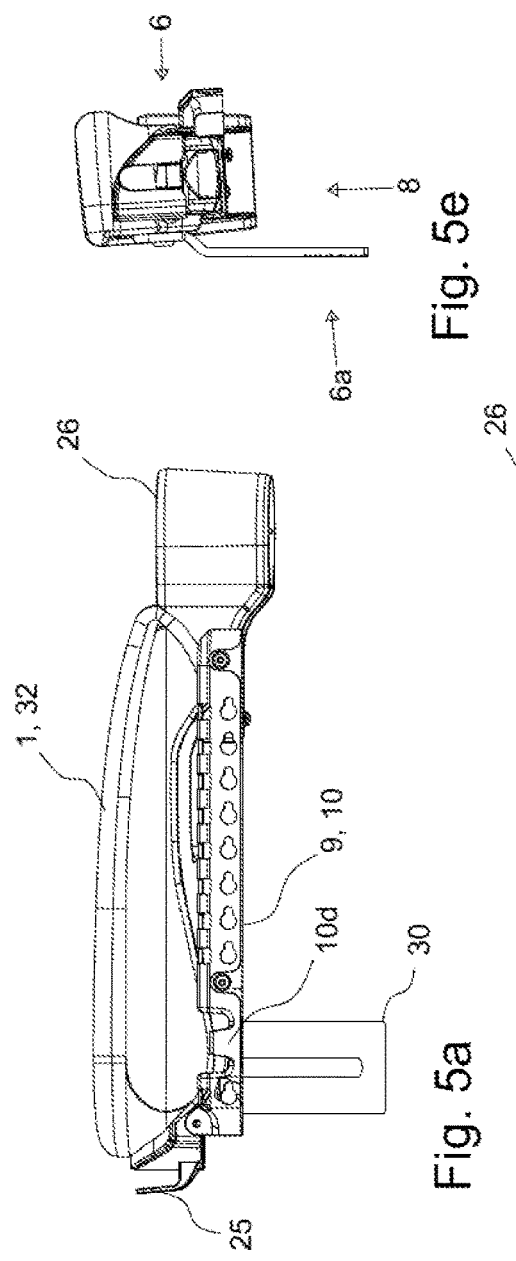
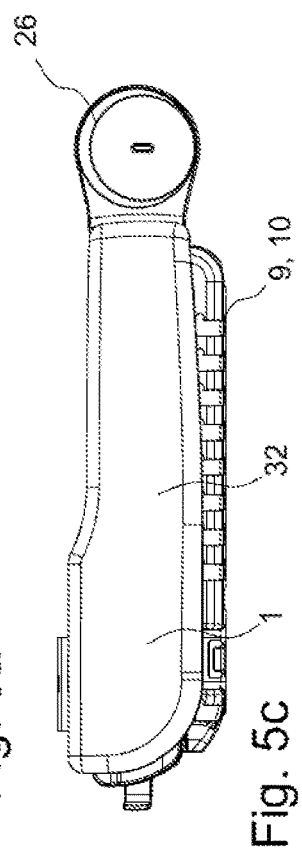
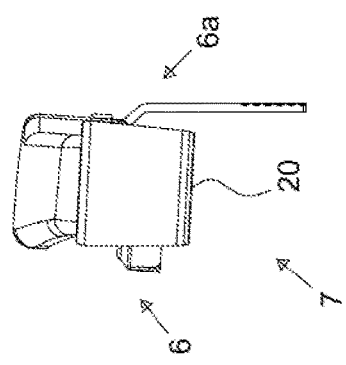

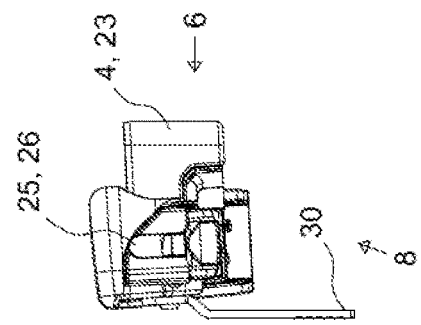
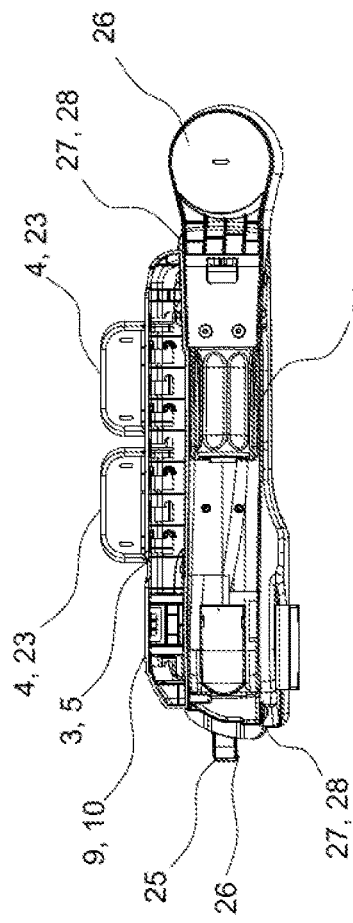
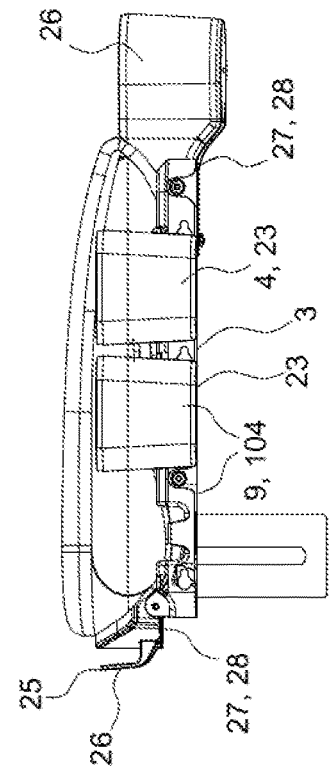
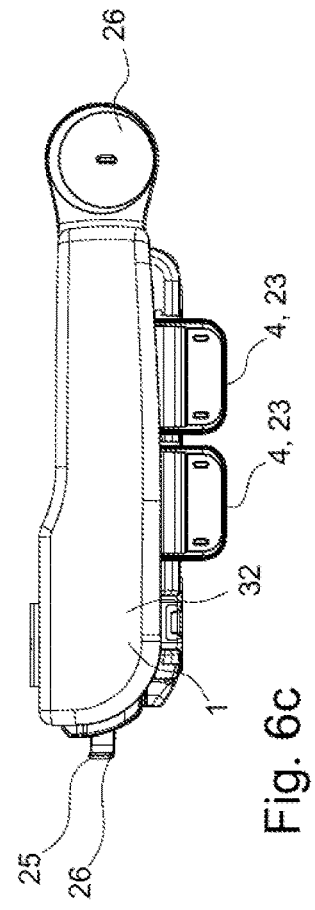
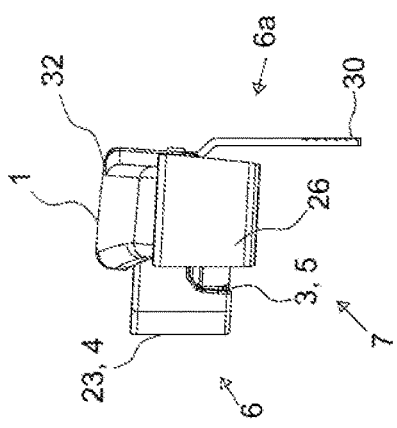

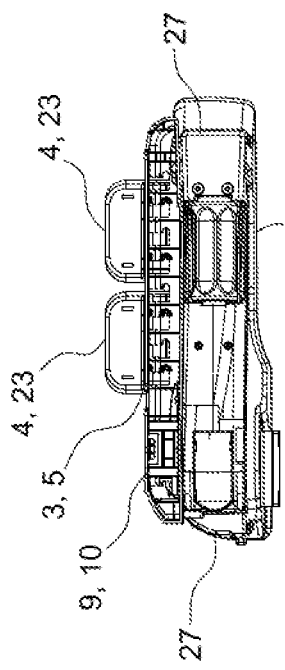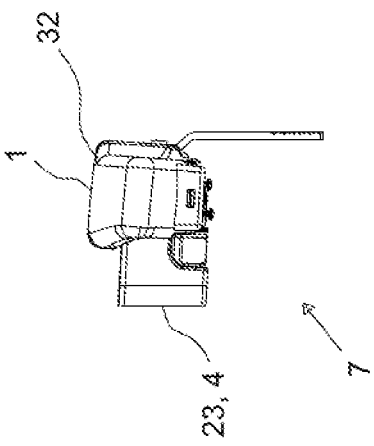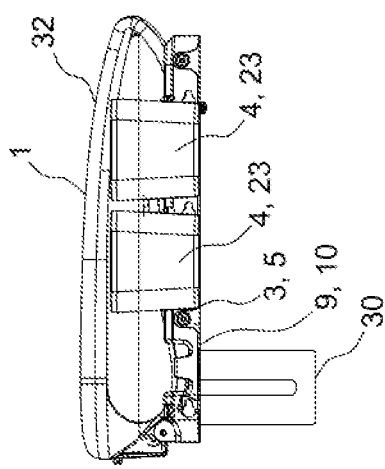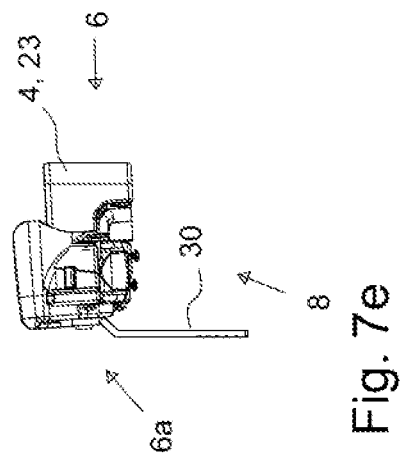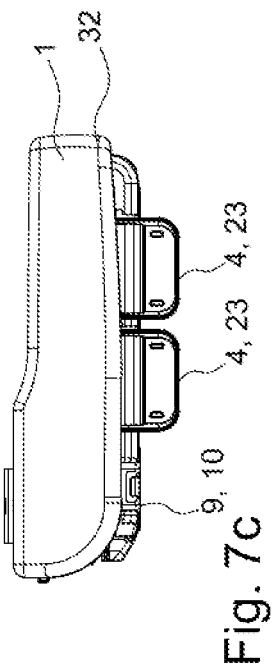

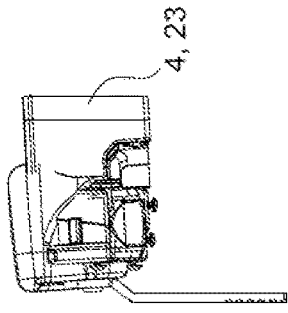
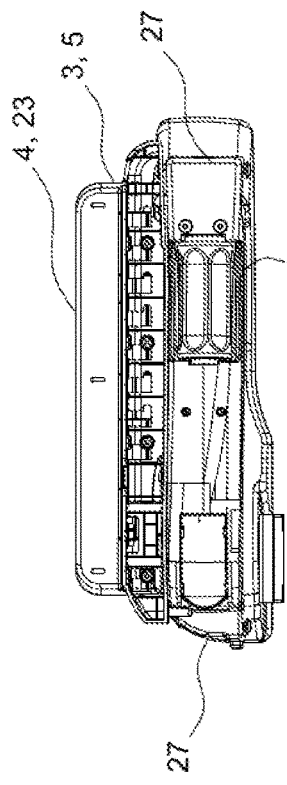
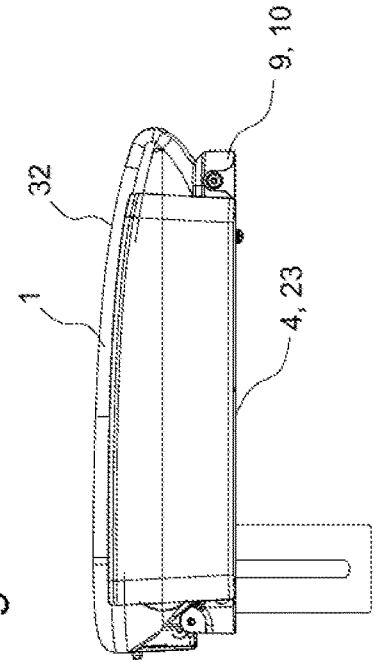
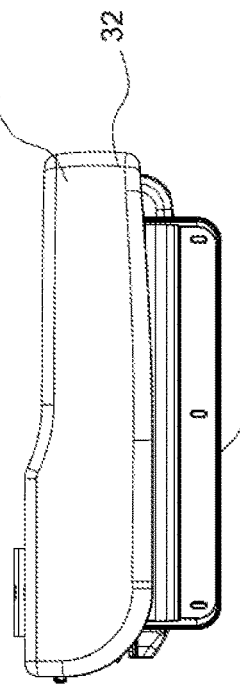
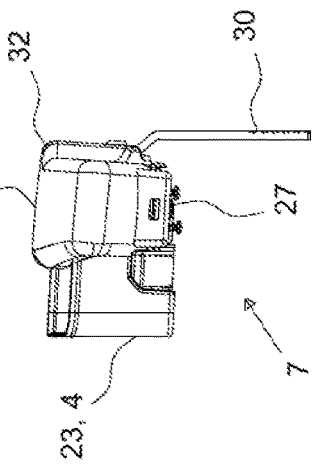

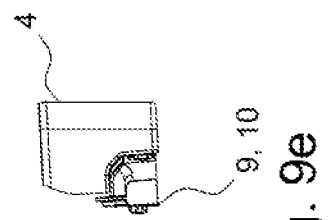
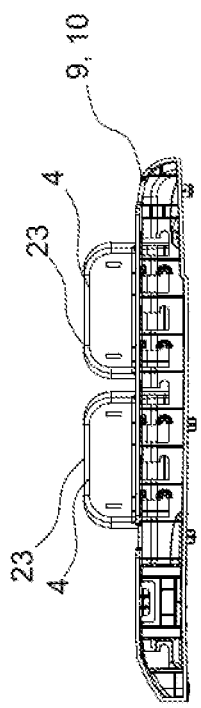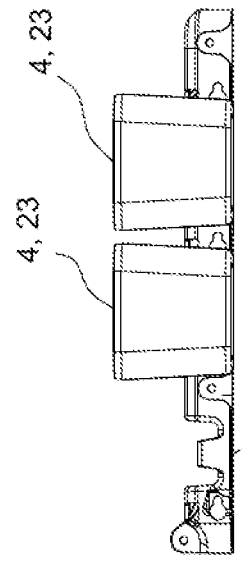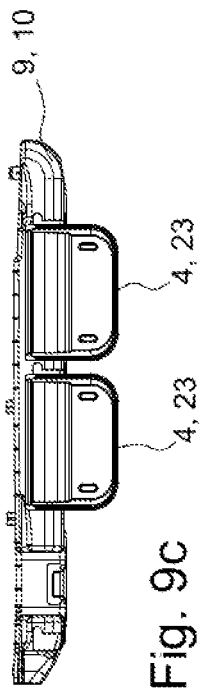
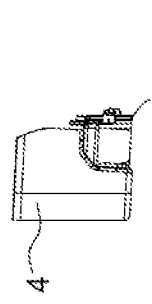

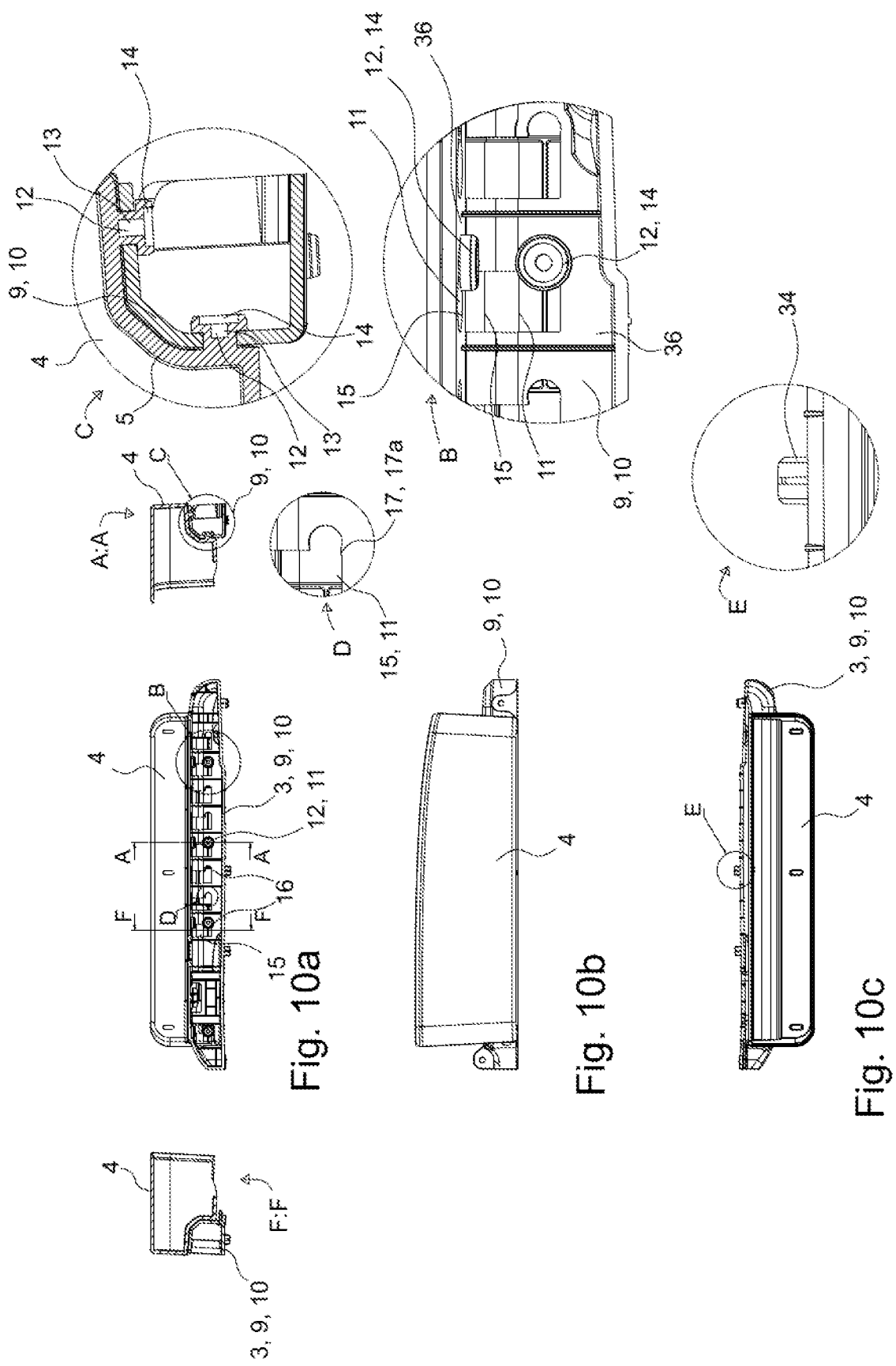

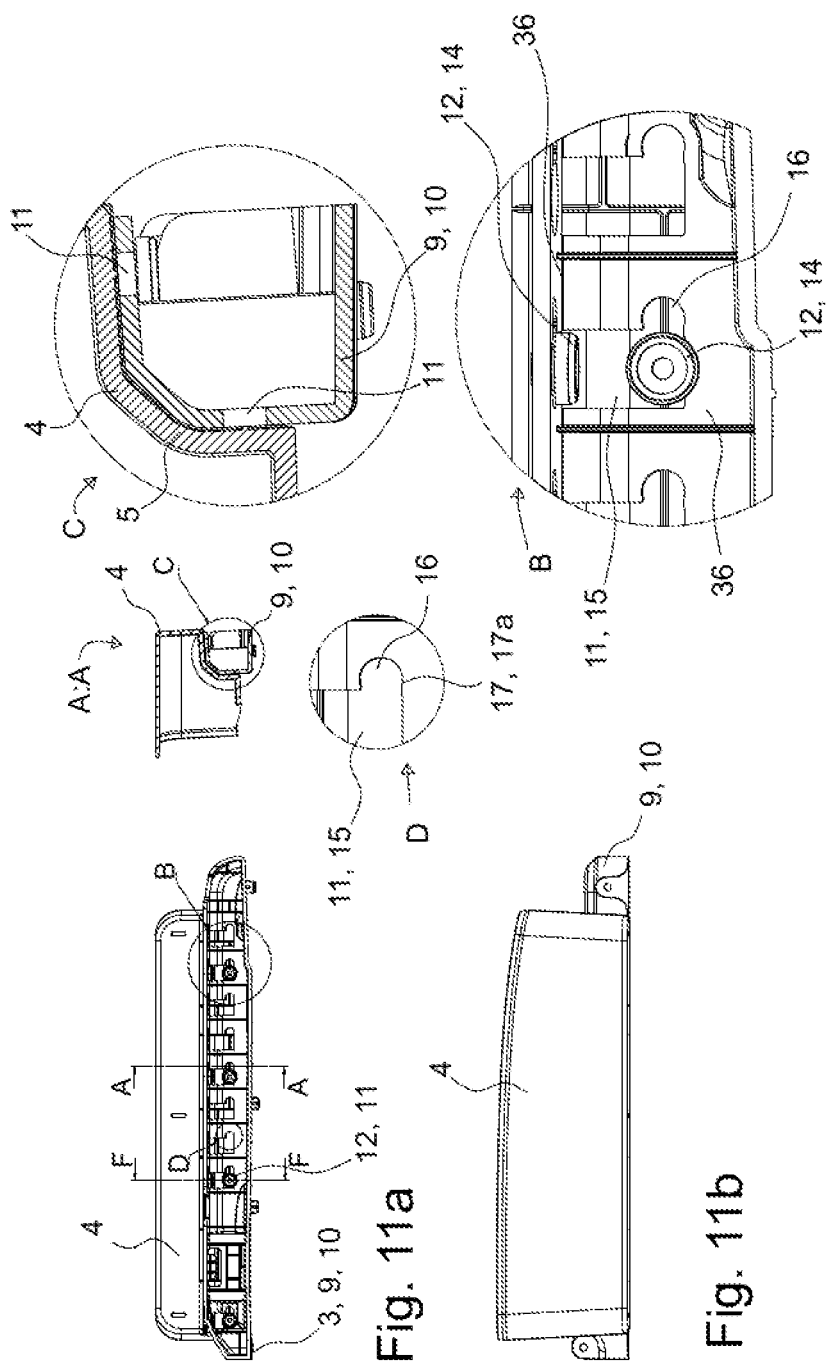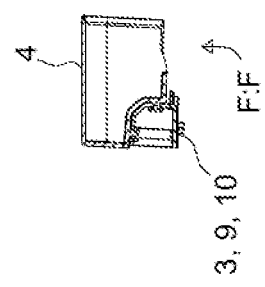

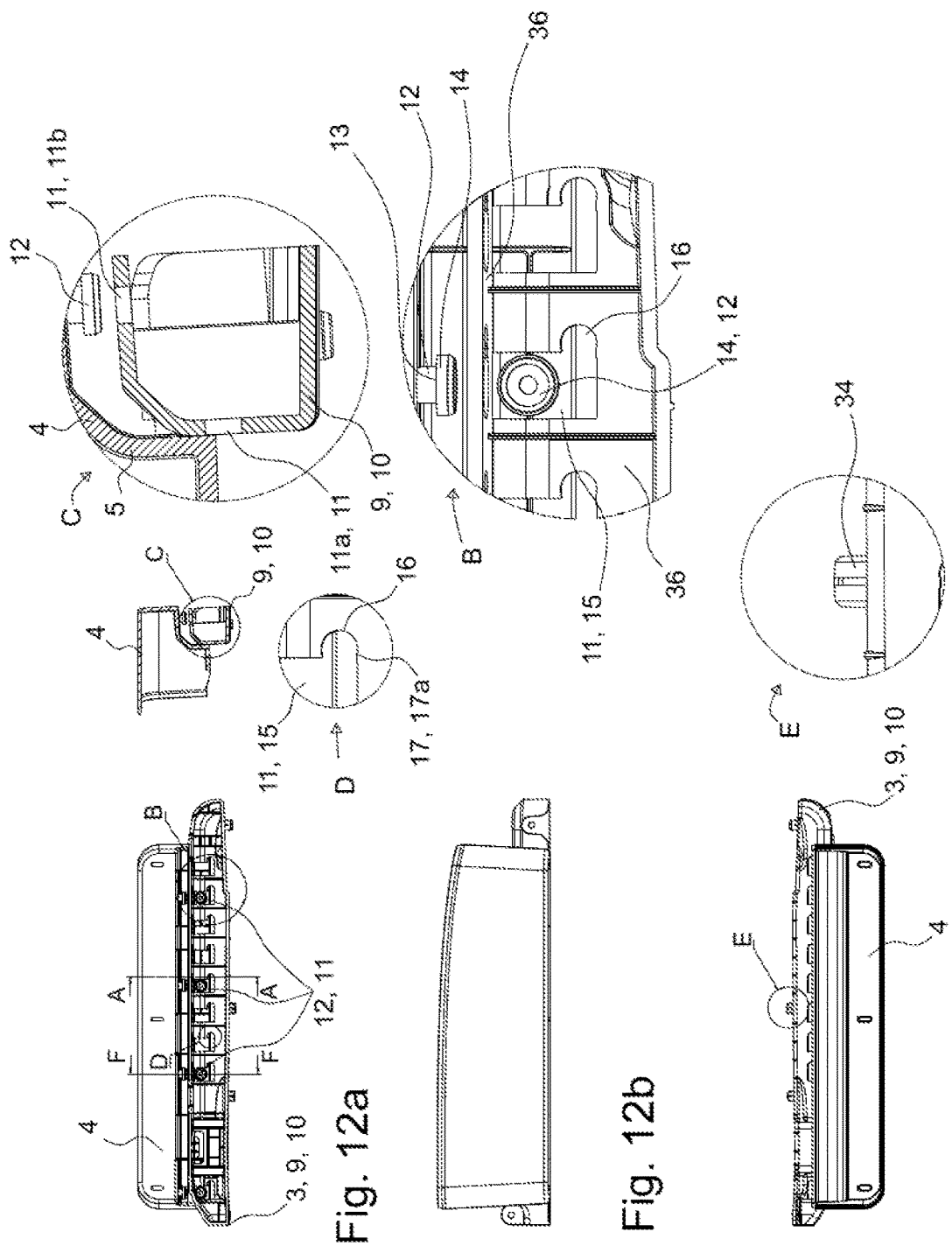
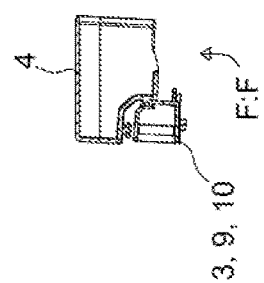
Fig. 12a
Fig. 12b
Fig. 12c

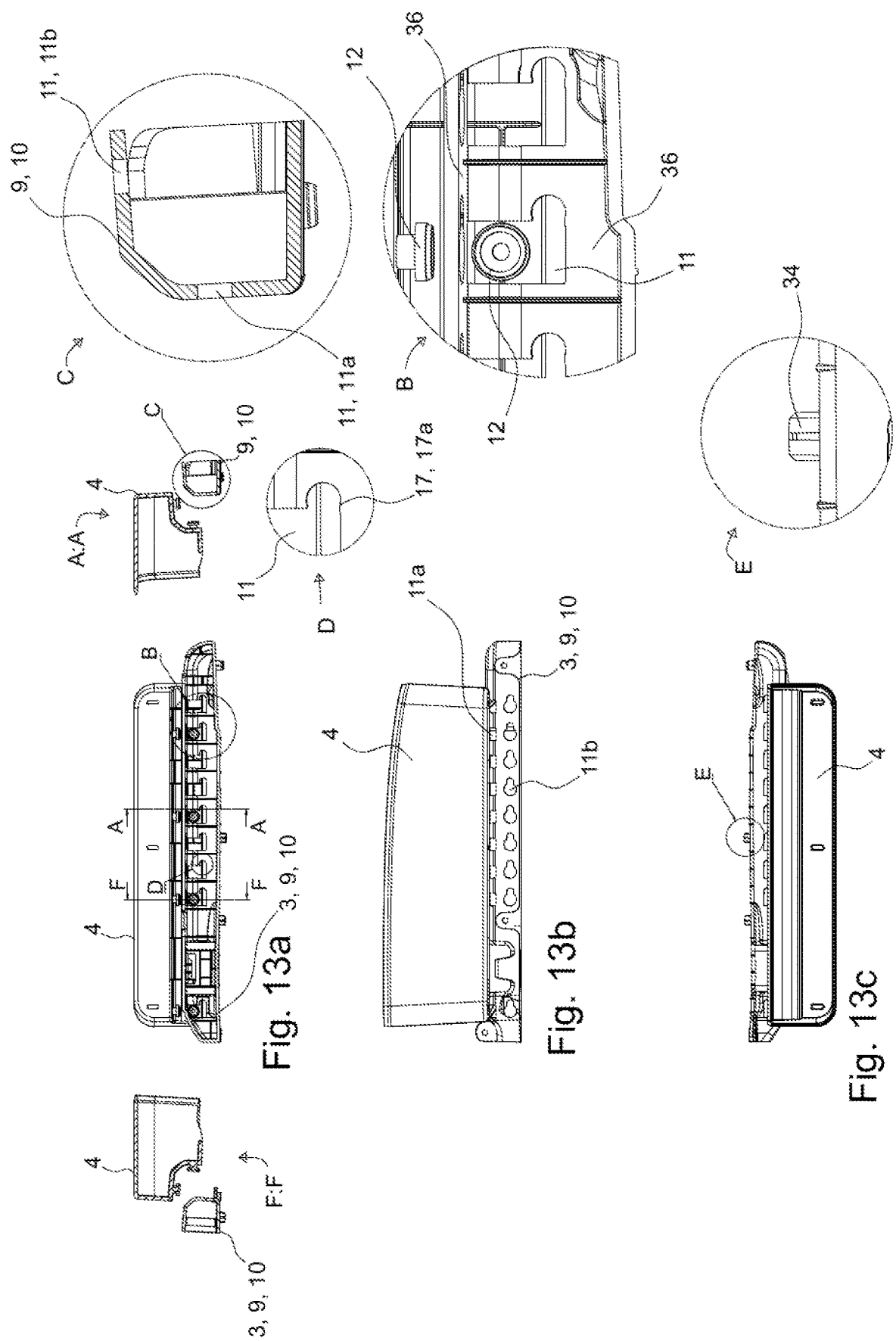

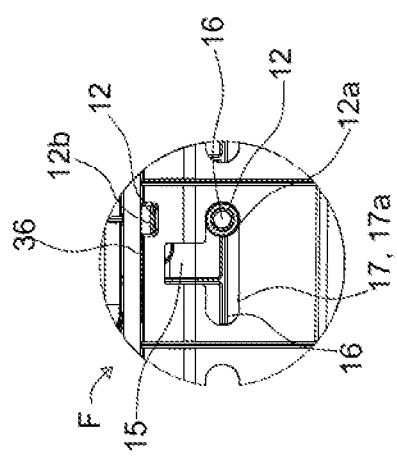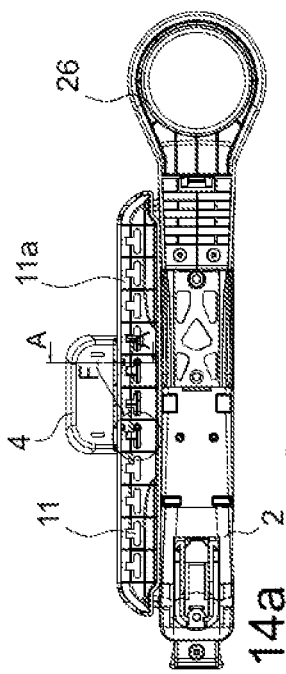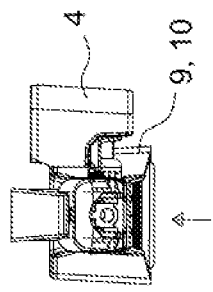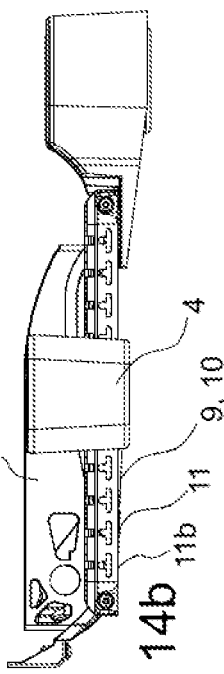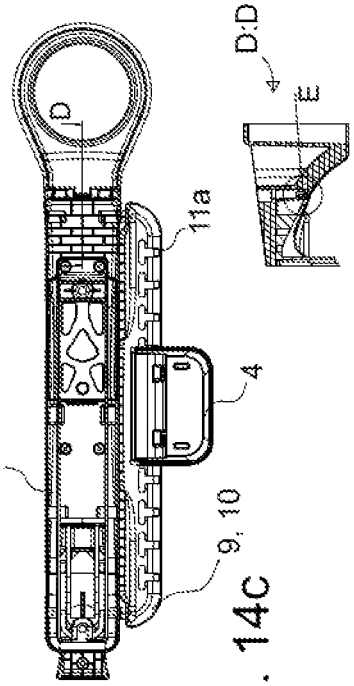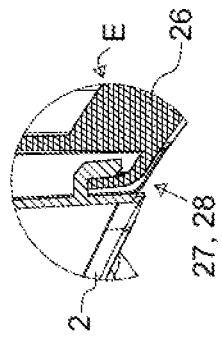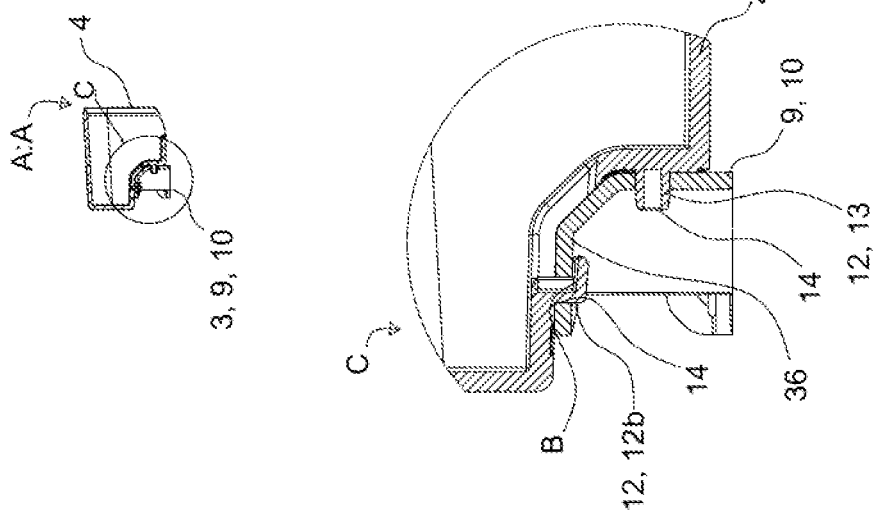

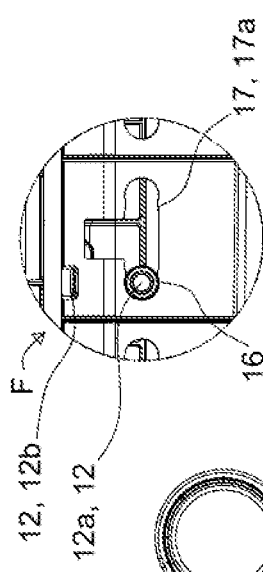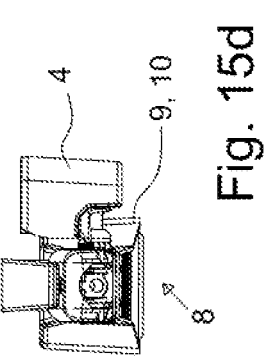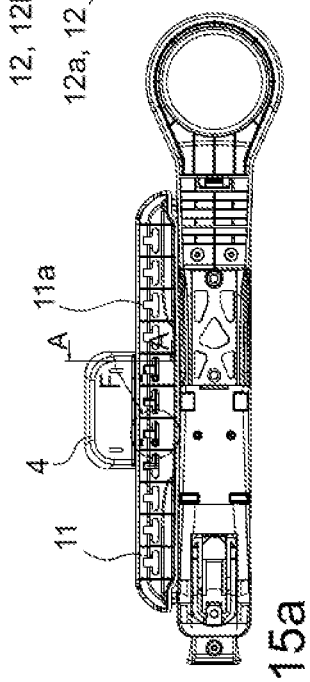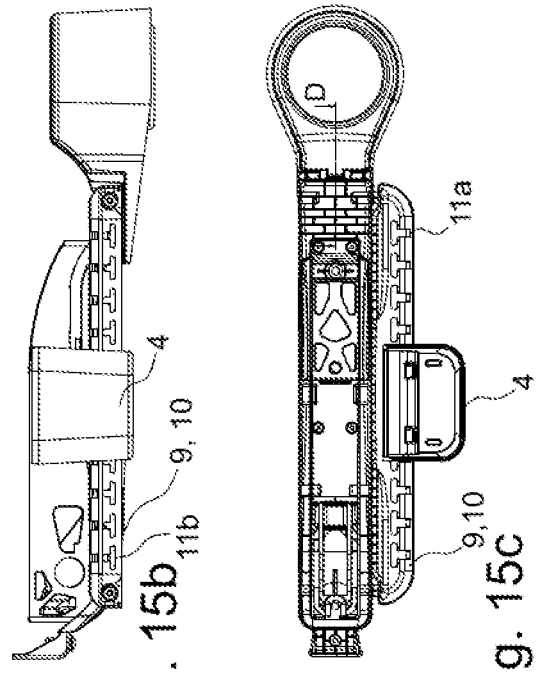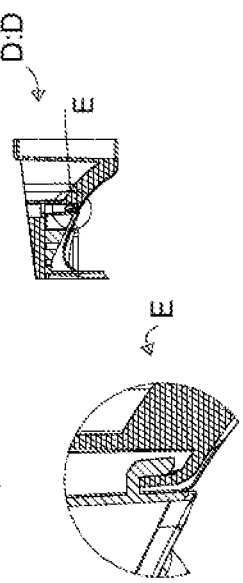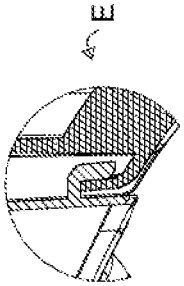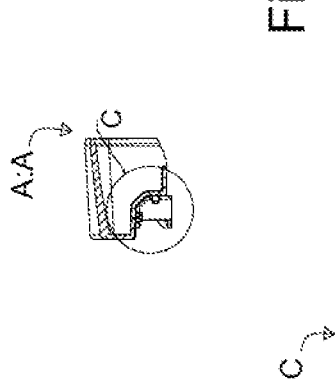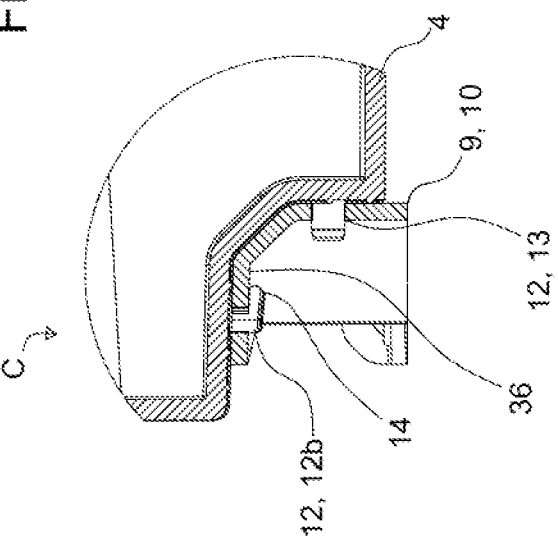

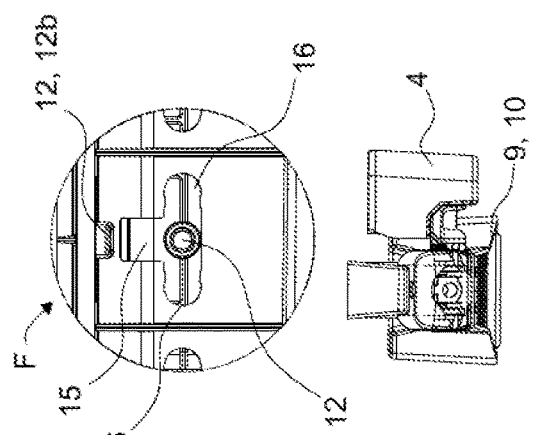
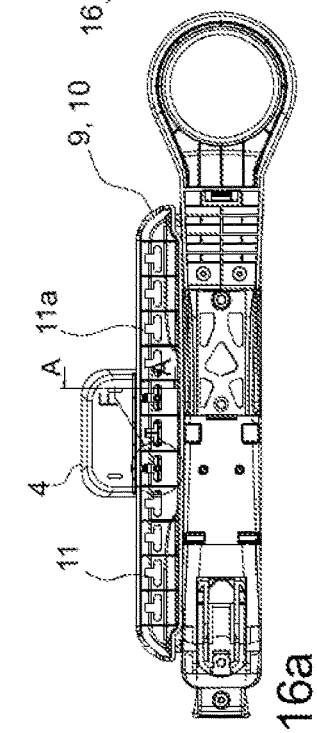
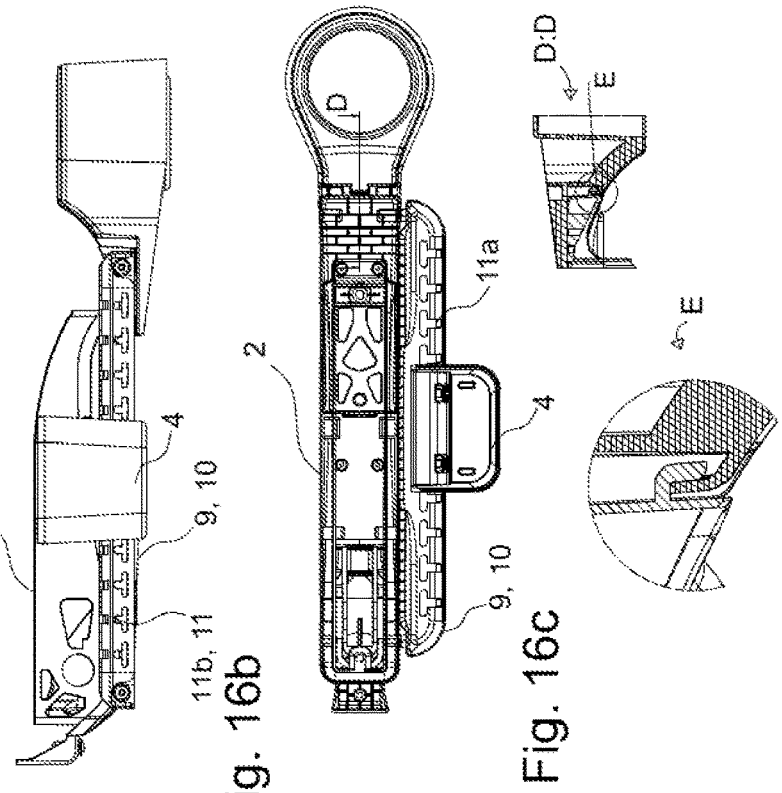
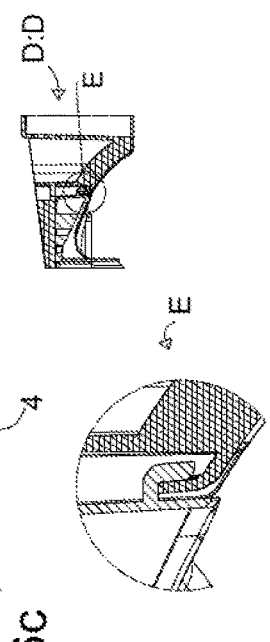
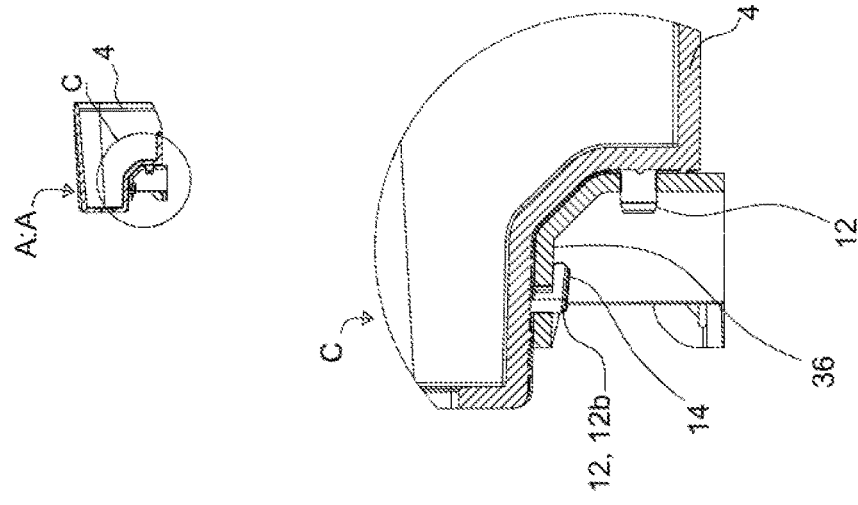

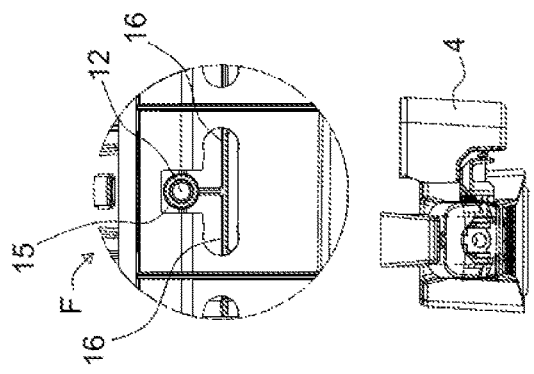
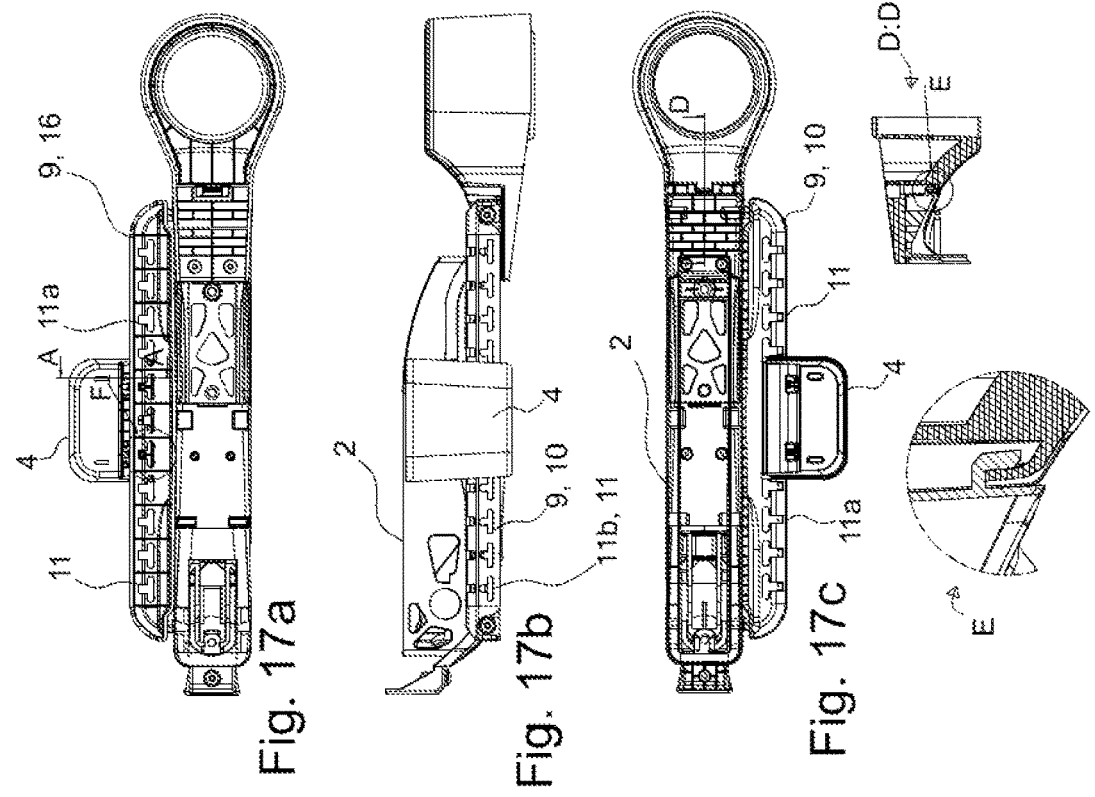
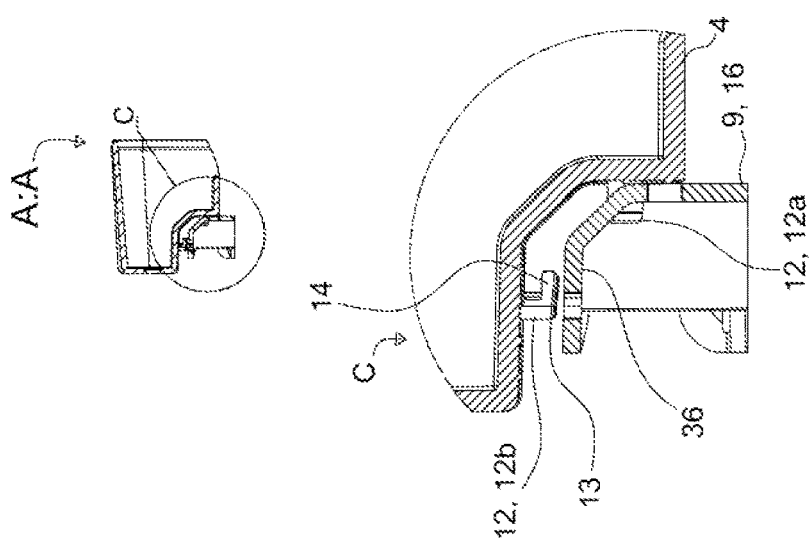

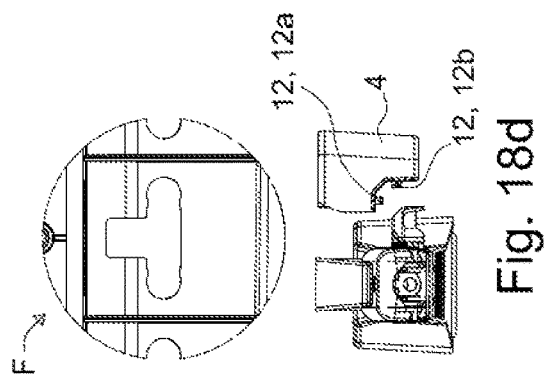
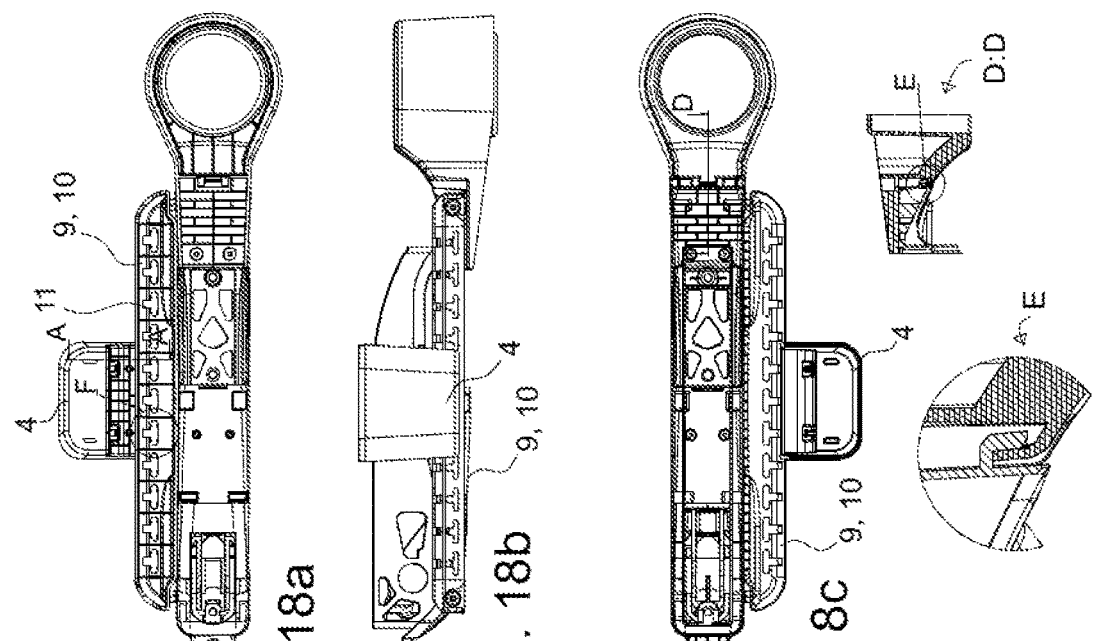
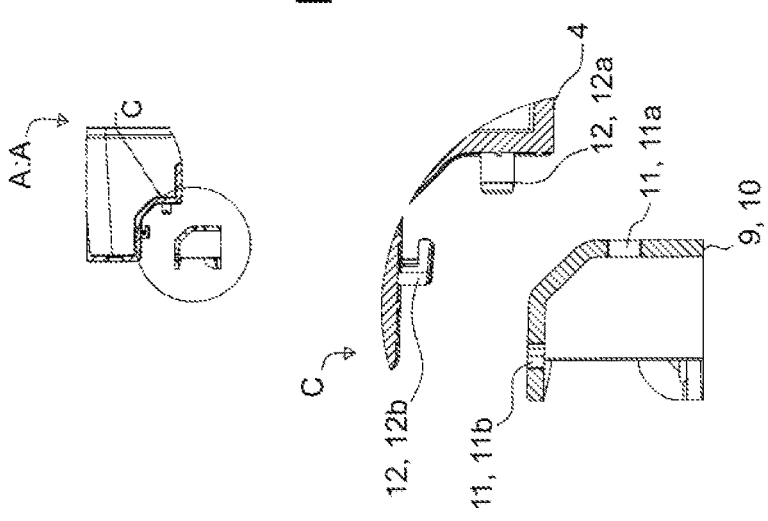

ARMREST ELEMENT

CROSS REFERENCE TO RELATED APPLICATION

This application claims the benefit of German Patent Application No. 10 2022 110 960.7, filed May 4, 2022, the contents of which are incorporated herein by reference in their entirety.

FIELD

The invention relates to an additional module for an armrest element of a seat, in particular a vehicle seat. Furthermore, the invention relates to a vehicle seat with an armrest element.

BACKGROUND

Such armrest elements are used, for example, in commercial vehicles such as tractors, forklifts, construction machinery and special vehicles. In such vehicles, the space available around the seat is often limited. Due to the lack of storage options elsewhere, there is a need to provide storage devices, holding devices and the like on the seat. Furthermore, it is desirable for various control and/or display devices to be attached directly to the seat, as this means that when the seat is deflected, there is as little relative movement as possible between the occupant's hand and the control and/or display devices due to the ground being driven over. The integration of such devices requires a wide variety of designs for the armrest element, depending on the customer's wishes. This means a great deal of effort for the manufacturers. In addition, it may be desirable to retrofit existing vehicle seats or armrests with such devices.

It is therefore the object of the present disclosure to provide an armrest element which solves the problems mentioned at the beginning.

SUMMARY

The object is solved by an armrest element according to the features described herein.

The main idea of the invention is an armrest element of a seat, in particular of a vehicle seat, having a base body, the armrest element having at least one first connection interface of predetermined design to which at least one exchangeable extension module having a second connection interface of predetermined design can be fixed, the first connection interface and the section ond connection interface being designed in such a way that at least one detent connection is made possible between the first connection interface and the second connection interface.

Preferably, at least one snap-in connection is provided between the first connection interface and the second connection interface.

By means of such a first connection interface of predetermined design, which is compatible with a corresponding second connection interface of predetermined design, a plurality of different extension modules can be arranged on the armrest element. The extension modules only need to have a second connection interface and can thus be arranged on the armrest without further ado. This results in a modular armrest that can be adapted to a variety of applications. The connection between the first connection interface and the second connection interface is a direct connection, as the two interfaces directly abut each other. A detent connection has the further advantage that this connection is easily detachable and thus the extension module can be easily replaced. At the same time, a detent connection ensures the necessary mechanical strength.

Preferably, the armrest element extends along a longitudinal axis (X), a width axis (Y) and a height axis (Z). The armrest element can advantageously be arranged on a seat. It is advantageous that an inclination adjustment device is provided by means of which the inclination of the armrest relative to the seat can be adjusted. Accordingly, due to the inclination to be adjusted, the longitudinal axis and, if applicable, the height axis of the armrest element can include an angle of inclination with the longitudinal axis or the height axis of the seat. The width axis of the armrest element can correspond to the width axis of the seat or enclose a preferably adjustable angle with it.

According to an advantageous embodiment, the armrest element comprises a support element which is arranged on the base body. Advantageously, the base body is arranged along the height axis under the support element. Preferably, the support element comprises or is an upholstery element. However, it is also conceivable that the base body itself forms a support surface. The support surface or support element provides the occupant with a surface to rest the arm on. An upper side of the base body includes the support surface or faces the support element. A lower side of the base body is opposite to the upper side. Advantageously, an operating element for adjusting the inclination of the armrest element is arranged on the lower side of the base body. This operating element can be a rotatably mounted rotary wheel or cylinder element. Preferably, the base body extends along a longitudinal axis (X), a width axis (Y) and a height axis (Z). Advantageously, the base body comprises an outer long side extending along the longitudinal axis (X), a front side extending along the width axis (Y) and a rear side extending along the width axis. The front side is spaced from and substantially opposite the rear side along the longitudinal axis. The expression "essentially" is intended to take into account tolerance deviations here and also in the following, which, however, do not impair the function of the elements. Advantageously, in an installed state of the armrest element, the rear side is closer to the backrest than the front side. The outer long side is spaced along the width axis from an inner long side and is substantially opposite the latter. The inner long side faces an occupant. According to an advantageous embodiment, a first connection interface is arranged on the long side of the base body. Preferably, the first connection interface is arranged on the outer long side.

According to a further aspect of the invention, it is advantageous in that the first connection interface is formed as an adapter element. Advantageously, the adapter element is arranged on the base body. Preferably, the adapter element is arranged on the base body by means of at least one positive connection. However, it would also be conceivable for the adapter element to be formed by or integrated into the base body. Preferably, the at least one positive connection is a screw connection. However, other positive connections are also conceivable. It would also be conceivable to use a material connection, for example an adhesive connection or a welded connection. Advantageously, the adapter element is designed as a strip-shaped element. Preferably, the strip-shaped element comprises a first section and a second section. Advantageously, the first section and the second section enclose an angle $\alpha$. The angle $\alpha$ is in a range between 30° and 120°, preferably in a range between 50° and 110°, more preferably in a range between 80° and 100°, more preferably 90°. Advantageously, the first section extends along the longitudinal axis and the width axis. Preferably, the second section extends along the longitudinal axis and the height axis.

According to a further preferred embodiment, at least one detent opening is provided into which at least one detent element can engage. It is advantageous that the at least one detent opening is provided on one of the connection interfaces and the at least one detent element is provided on the other connection interface.

According to one embodiment, the first connection interface preferably in the form of the adapter element comprises a plurality of detent openings. Furthermore, the second connection interface preferably comprises at least one detent element. It is also conceivable that the first connection interface preferably in the form of the adapter element comprises a plurality of detent elements and the second connection interface comprises at least one detent opening. Providing a plurality of detent openings or detent elements on the first connection interface has the advantage that an extension module can be positioned at different positions along the longitudinal axis. Likewise, several extension modules can be placed next to each other.

According to a further aspect of the invention, a first group of detent openings is provided on the first section of the strip-shaped element and a second group of detent openings is provided on the second section of the strip-shaped element. Preferably, the detent openings of the respective groups are configured in the same manner. Preferably, the detent openings of the first group can be formed differently or identically to the detent openings of the second group. Preferably, one member of the first group of detent openings and one member of the second group of detent openings each form a pair of detent openings. The two detent openings of a pair of detent openings may have a predetermined orientation relative to each other. It is conceivable that both detent openings of a pair of detent openings have the same position along the longitudinal direction (X) (for example, an equal distance from one end of the strip-shaped element). However, it is also conceivable that the two detent openings of a pair of detent openings have a certain offset from each other along the longitudinal axis. In this case, the pairs of detent openings associated with the connection interface are identical.

According to an advantageous embodiment, the second connection interface comprises at least one first group of detent elements and at least one second group of detent elements. Preferably, each of the groups comprises at least one detent element. Advantageously, a member of the first group of detent elements and a member of the second group of detent elements each form a pair of detent elements. The two detent elements of a pair of detent elements may have a predetermined alignment with respect to each other. It is conceivable that both detent elements of a pair of detent elements have the same position along the longitudinal direction (X). However, it is also conceivable that the two detent elements of a pair of detent elements have a specific offset from each other along the longitudinal axis. In this case, the pairs of detent elements associated with the connection interface are identical. Advantageously, a pair of detent elements is compatible with a pair of detent openings. The detent elements of the respective group are preferably formed identically. Preferably, the detent elements of the first group can be formed differently or identically to the detent elements of the second group.

According to a further advantageous embodiment, the at least one detent element comprises a first pin-shaped section and a securing section arranged thereon. The pin-shaped section has an elongated extension, preferably along the width axis. The securing section preferably has an enlarged surface. The enlarged surface extends in a plane which is substantially perpendicular to the elongate extent of the pin-shaped portion. A detent element could thus be mushroom-shaped. According to a further embodiment, the securing section has an elongate extension which includes an angle $\beta$ with the elongate extension of the pin-shaped section. The angle $\beta$ is preferably in a range between 50 and 100° preferably substantially 90°. According to this embodiment, the detent element could be described as hook-shaped.

According to a further advantageous embodiment, the detent openings have an insertion area and at least one detent area. Preferably, the insertion area is dimensioned such that the securing section of a detent element can be passed through it. Preferably, a detent area of the detent opening has a reduced opening compared to the insertion area, which can receive the first pin-shaped section of a detent element. According to one embodiment, the detent opening comprises only one detent area. According to a further embodiment, the detent opening comprises two detent areas opposite each other along the longitudinal axis. The entire detent opening would thus be described as being substantially T-shaped.

When arranging a connection interface on the further connection interface, the at least one detent element is first placed in the detent openings in such a way that the securing section is guided through the insertion area. Preferably, the securing section then lies in a first position behind an opening plane of the insertion area. Subsequently, the at least one detent element is displaced along the longitudinal axis to an end position in which the pin-shaped portion of the detent element is located in the detent area of the detent opening. The securing section of the detent element then rests against an inner wall of the adapter element due to the reduced opening area of the detent area. This contact secures the second connection interface or the extension module. In an embodiment with two groups of detent openings or detent elements, the detent elements of the at least one pair of detent elements are guided through the insertion areas of the provided detent openings to the first position. The detent elements are then displaced along the longitudinal axis (X) so that both detent elements of a pair of detent elements enter the respective detent area.

According to a further preferred embodiment, a transition area with a narrowing is provided between the insertion area of the detent opening and the detent area of the detent opening. The narrowing can be a punctual or circumferential elevation. The narrowing is dimensioned in such a way that an increased amount of force is necessary to move the pin-shaped section into the detent area of the detent opening. A low elasticity of the narrowing and/or the detent opening and/or the detent element is sufficient to move the detent element through the narrowing. In the end position, the narrowing secures the first pin-shaped section of the detent element in the detent area of the detent opening. Unintentional slipping of the detent element out of the detent section is thus prevented by the narrowing.

According to a further preferred aspect of the invention, the at least one extension module is or comprises an active extension module. Preferably, the active extension module is selected from the group comprising: an input and/or output device, a joystick, a steering wheel, a pushbutton and/or switching element, a touch screen, a display device or combinations of the aforementioned elements. Of course, further similar active extension modules are also conceivable. Thus, any input and/or output devices can be easily arranged mechanically on the base body. It is advantageous that the base body comprises connection possibilities for the power supply and/or for data lines for the respective active extension module. Advantageously, the active extension module can be arranged on the front side of the base body.

According to a further advantageous embodiment, the at least one extension module is or comprises a passive extension module. Preferably, the passive extension module is selected from the group comprising: a storage element, a holder element, for example a cup holder, a hook element, a pocket, a net, an ashtray, an additional cushion or combinations of the aforementioned elements. Of course, other similar passive extension modules are also conceivable. Such passive extension modules can be arranged both on the front side and on the rear side of the base body.

According to a further embodiment, a further extension module is arranged on the front side and/or on the rear side of the base body. Preferably, the further extension module is an active extension module, a passive extension module or a combination of an active and a passive extension module. The active extension module may be selected from the group comprising: an input and/or output device, a joystick, a steering wheel, a pushbutton and/or switching element, a touch screen, a display device or combinations of the aforementioned elements. Preferably, the passive extension module is selected from the group comprising: a storage element, a holder element, a hook element, a bag, a net, an ashtray, an additional pad or combinations of the aforementioned elements. Of course, further similar active or passive extension modules are also conceivable.

Advantageously, a third connection interface of predetermined design is provided, which is arranged or formed on the front side and/or the rear side of the base body. Preferably, the at least one further extension module has a fourth connection interface of predetermined design which is compatible with the third connection interface. Preferably, at least one positive connection is provided between the third connection interface and the fourth connection interface.

A positive connection involves an action that occurs through the geometric contact of two active surfaces. The connection may have a clearance between the active surfaces and allows one or more degrees of freedom of movement. A positive connection may also comprise the use of a connecting element between two elements to be connected. Such a connecting element may be, for example, a screw, a pin, a rivet or the like. Advantageously, the at least one positive connection between the third connection interface and the fourth connection interface is a releasable connection. This enables the interchangeability of the extension modules. According to another preferred embodiment, a first positive connection in the form of a fitting connection is provided between the third connection interface and the fourth connection interface. Preferably, the fitting connection is as free of play as possible. Preferably, one of the connection interfaces comprises a receptacle in which a connecting section of the further connection interfaces is received. The connecting section and the receptacle are thus substantially complementary to each other. Advantageously, the third connection interface comprises the connecting section and the fourth connection interface comprises the receptacle. However, it is also conceivable that the fourth connection interface comprises the connecting section and the third connection interface comprises the receptacle.

According to a further preferred embodiment, the at least one extension module and/or the at least one further extension module is designed in such a way that at least one additional extension module can be arranged thereon. The at least one extension module and/or the at least one further extension module are or comprise a fifth connection interface. The fifth connection interface is thus an indirect interface. The additional extension module can preferably be arranged on the at least one extension module or the at least one further extension module by a non-positive connection. The fifth connection interface may for example represent at least one opening, at least one protrusion or the like, in or on which clamping devices of the additional extension module may engage. However, such an opening could also be an opening of the passive extension module, for example the storage element or cupholder. Such an additional extension module could be, for example, a holding device for a smartphone or mobile phone.

The object is also solved by a vehicle seat with an armrest element. The vehicle seat can be equipped with all the features described above in the context of the armrest element, either individually or in combination with each other, and vice versa.

BRIEF DESCRIPTION OF THE DRAWINGS

Further advantages, objectives and features of the present invention are explained with reference to the following description of the accompanying figures. Similar components may have the same reference signs in the various embodiments.

Show in the figures:

FIG. 5a-5e different views of an armrest element according to an embodiment;

FIG. 6a-6e different views of an armrest element according to an embodiment;

FIG. 7a-7e different views of an armrest element according to an embodiment;

FIG. 8a-8e different views of an armrest element according to an embodiment;

FIG. 9a-9e different views of an adapter element according to one embodiment;

FIG. 10a-10c different views of an adapter element according to an embodiment with an extension module in one position;

FIG. 11a-11c different views of the adapter element according to an embodiment with an extension module in a further position;

FIG. 12a-12c different views of the adapter element according to an embodiment with an extension module in a further position;

FIG. 13a-13c different views of the adapter element according to an embodiment with an extension module in a further position;

FIG. 14a-14d different views of the adapter element according to an embodiment with an extension module in a further position;

FIG. 15a-15d different views of the adapter element according to an embodiment with an extension module in a further position;

FIG. 16a-16d different views of the adapter element according to a further embodiment with an extension module in a further position;

FIG. 17a-17d different views of the adapter element according to a further embodiment with an extension module in a further position;

FIG. 18a-18d different views of the adapter element according to a further embodiment with an extension module in a further position.

DETAILED DESCRIPTION

Figure 1:
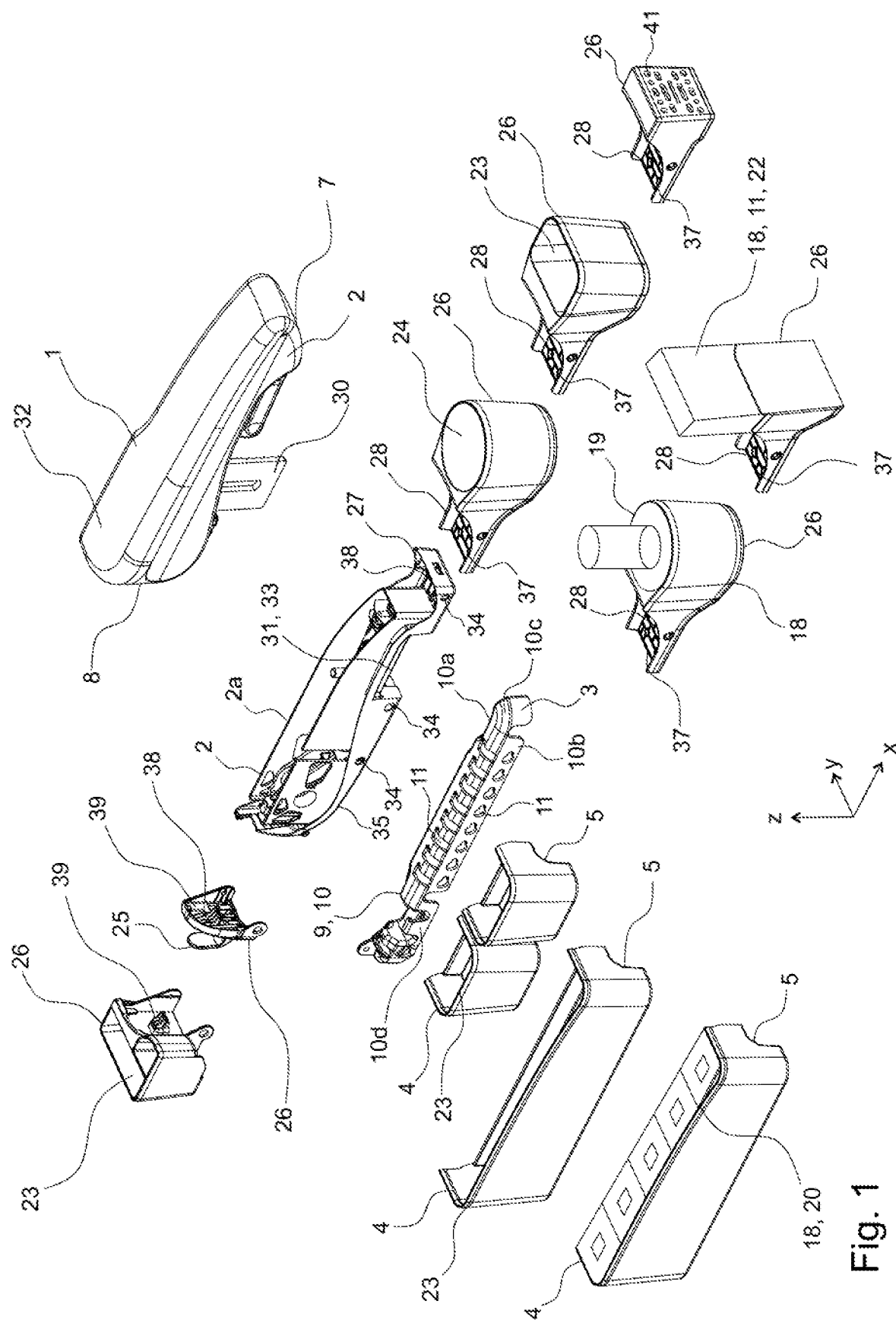
FIG. 1 an exploded view of an armrest element according to one embodiment.

In the figures, identical components are to be understood with the corresponding reference signs. For the sake of clarity, some components may not have a reference sign in some figures, but have been designated elsewhere.

FIGS. 1, 2 to 8e show an armrest element 1 of a seat, in particular of a vehicle seat 100, having a base body 2, the armrest element 1 having at least one first connection interface 3 of predetermined design to which at least one exchangeable extension module 4 having a second connection interface 5 of predetermined design can be fixed, the first connection interface 3 and the second connection interface 5 being designed in such a way that at least one detent connection is made possible between the first connection interface 3 and the second connection interface 5. At least one detent connection is provided between the first connection interface 3 and the second connection interface 5. A multitude of different extension modules 4 can be arranged on the armrest element 1 by means of such a predetermined, preferably even standardised connection interface.

Figure 2:
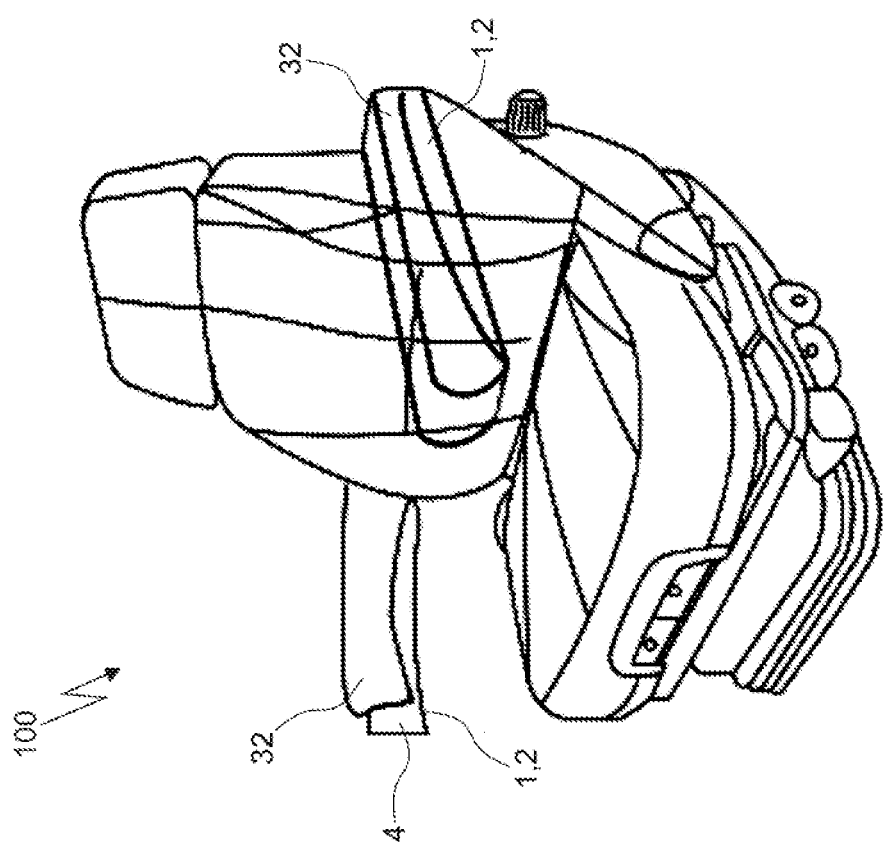
FIG. 2 a vehicle seat with the armrest element.

The armrest element 1 extends along a longitudinal axis X, a width axis Y and a height axis Z. The armrest element 1 can be arranged on a seat 100. This is shown in FIG. 2. For this purpose, a fastening element 30 is provided, which is attached to the base body 2. A tilt adjustment device can be provided by means of which the tilt of the armrest element 1 relative to the seat 100 can be adjusted. The inclination adjustment device can be operated with an operating element 31 in the form of a rotatably arranged cylinder element. This operating element 31 is arranged on a lower side 2b of the base body 2. The base body 2 has a recess 33 for this purpose.

According to an advantageous embodiment, the armrest element 1 comprises a support element 32 which is arranged on the base body 2. The base body 2 is arranged along the height axis Z under the support element 32. The support element 32 comprises or is a cushioning element. The support element 32 provides the occupant with a surface to rest the arm on. An upper side 2a of the base body 2 faces the support element 32. The lower side 2b of the base body 2 is opposite to the upper side 2a. The base body 2 comprises a lower portion from which side walls 35 extend along the height axis Z. On the upper side 2a, the base body 2 is open and covered by the support element 32.

The base body 2 comprises an outer long side 6 extending along a longitudinal axis X. The outer long side 6 is spaced along the width axis Y from an inner long side 6a and is substantially opposite the latter. The inner long side 6a faces an occupant. Furthermore, the base body 2 comprises a front side 7 extending along the width axis Y and a rear side 8 extending along the width axis Y. The front side 7 is spaced from the rear side 8 along the longitudinal axis X and is substantially opposite thereto.

Figure 3B:
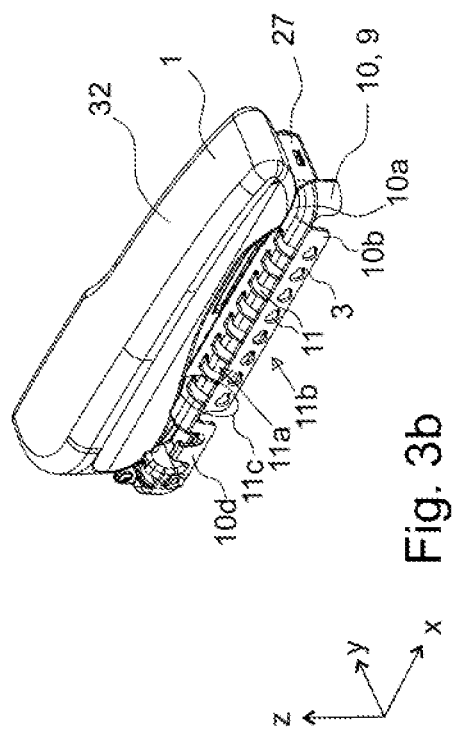
FIG. 3b an armrest element according to an embodiment.
Figure 3D:
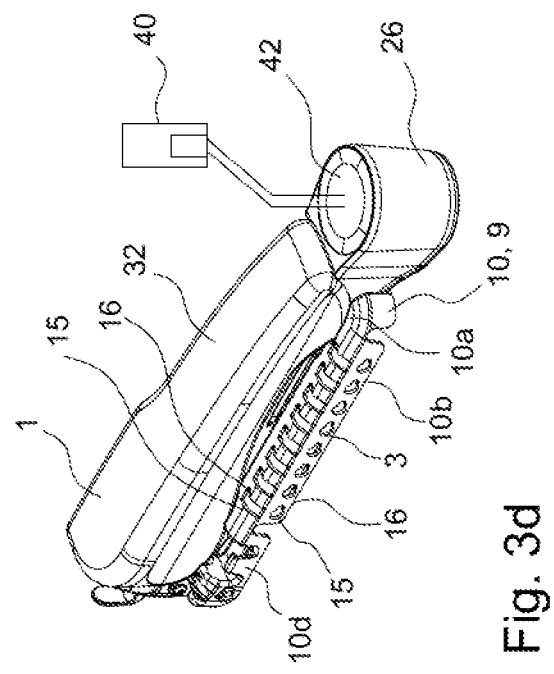
FIG. 3d an armrest element according to an embodiment.

The first connection interface 3 is designed as an adapter element 9, which is arranged on the base body 2. The adapter element 9 is arranged on the base body 2 by means of at least one positive connection, preferably by means of at least two positive connections. For this purpose, the base body 2 has at least one, preferably two, more preferably three holes 34 on a section of a side wall 35, by means of which an adapter element 9 can be fastened. The at least one hole 34 can be designed as a blind hole and is provided with an internal thread into which a screw can be screwed. The adapter element 9 is designed as a strip-shaped element 10. The strip-shaped element 10 comprises a first section 10a and a second section 10b. The first section 10a and the second section 10b enclose an angle α which is preferably in a range between 80° and 100°, more preferably at 90°. The strip-shaped element 10 may also be described as an angled strip element. Such a configuration allows the extension module 4 to be adequately secured in multiple degrees of freedom. The first section 10a extends along the longitudinal axis X and the width axis Y and is accordingly oriented substantially horizontally. The second section 10b extends along the longitudinal axis X and the height axis Z and is accordingly oriented substantially vertically. In FIGS. 13b, 3c, 3d, among others, it can further be seen that a transition section 10c is formed between the first section 10a and the second section 10b, which is rounded or bevelled. Furthermore, it can be seen that hook element 10 is integrated in the strip-shaped element 10, the hook element being intended for hanging up any objects.

At least one detent opening 11 is provided, into which at least one detent element 12 engages. The at least one detent opening 11 is provided on one of the connection interfaces 3, 5 and the at least one detent element 12 is provided on the other connection interface 5, 3. The first connection interface 3 is in the form of the adapter element 9 a plurality of detent openings 11, which can be grouped into a first group 11a of detent openings 11 and a second group 11b of detent openings 11. The first group 11a of detent openings 11 is provided on the first section 10a of the strip-shaped element 10. These detent openings 11 extend into the transition area 10c of the strip-shaped element 10. The second group 11b of detent openings 11 is provided on the second section 10b of the strip-shaped element 10. One member of each of the first group 11a of detent openings 11 and one member of the second group 11b of detent openings 11 is a pair of detent openings 11c. As can be seen from the figures, the detent openings 11 of a pair of detent openings 11c have a predetermined orientation with respect to each other, i.e. they are arranged at the same position along the longitudinal axis X. The second connection interface 5 comprises at least one first group 12a of detent elements 12 and at least one second group 12b of detent elements 12. A respective member of the first group 12a of detent elements 12 and a respective member of the second group 12b of detent elements 12 form a pair of detent elements 12c and have a predetermined alignment with respect to each other, analogously to the detent openings 11. A pair of detent elements 12c is compatible with a pair of detent openings 11c. The at least one detent element 12 has a first pin-shaped section 13 and a securing section 14 arranged thereon. The detent openings 11 have an insertion area 15 and at least one detent area 16. The insertion area 15 is dimensioned such that the securing section 14 of a detent element 12 can be passed through it. The detent area 16 has a reduced opening compared to the insertion area 15, which can receive the first pin-shaped section 13 of a detent element 12. Between the insertion area 15 of the detent opening 11 and the detent area 16 of the detent opening 11, a transition area 17 is provided with a narrowing 17a which secures the first pin-shaped section 13 of a detent element 12 in the detent area 16 of the detent opening 11.

FIGS. 10a, 10b, 10c to 13a, 13b, 13c show a first embodiment of the detent connection. The strip-shaped element 10 shown in these figures is also shown in FIGS. 1, 3b, 3d, 3c, 5a-5e, 6a-6e, 7a-7e, 8a-8e and 9a-9c. FIGS. 10a, 10b, 10c show an end position in which the extension module 4 is arranged on the adapter element 9. FIG. 10b shows a side view and FIG. 10c a top view from above. The enlarged section E of FIG. 10c shows the attachment of the adapter element 9 to the base body 2 by means of the hole 34. FIG. 10a shows a top view from below. The two sections A:A and F:F show the shape of the adapter element 9, once a section with a detent element 12 and once a section without a detent element 12. In the enlargement C the design of the detent element 12 is clearly visible. The pin-shaped section 13 is pin-like or circular-cylindrical in shape. The securing section 14 is arranged at the front end of the pin-shaped section 13, which is circular disc-shaped. Apart from the length of the pin-shaped sections 13, the detent elements 12 of the first group 12a and the second group 12b are of substantially the same design. In the enlargement B it is clearly visible that the securing section 14 rests against an inner wall 36 of the adapter element 9 and thus secures the extension module 4.

In this adapter element 9, the detent openings 11 of the first group 11a are formed differently from the detent openings 11 of the second group 11b. The detent openings 11 of the first group 11a have a substantially rectangular insertion area 15, whereas the detent openings 11 of the second group 11b have a substantially circular insertion area 15. The detent area 16 of both groups 11a, 11b is shaped like a segment of a circle.

The transition area 17 between the detent area 16 and the insertion area 15 with the narrowing 17a is clearly visible, for example, in the magnification D. The extension module 4 shown in FIGS. 10a, 10b, 10c to 13a, 13b, 13c is arranged on the adapter element 9 by means of four pairs of detent elements 12c, each of which engages or snaps into four pairs of detent openings 11c, respectively. FIGS. 11a-11c, 12a-12c and 13a-13c show the step-by-step procedure of removing the extension module 4. These FIGS. 11a-11c, 12a-12c and 13a-13c otherwise correspond to FIGS. 10a-10c. A description of the similar elements as well as the different views is therefore omitted. In FIGS. 11a-11c, the detent elements 12 in the detent openings 11 have been moved from the detent area 16 to the insertion area 15 via the transition area 17. A greater force would have to be applied to overcome the narrowing 17a. In the condition shown by FIGS. 12a-12c, the detent elements 12 of the second group 12b have already been removed from the detent openings 11 of the second group 11b. Due to the elongated dimension of the insertion areas 15 of the detent openings 11 of the first group 11a, the detent elements 12 of the first group 12a are still located in the corresponding insertion areas 15. In the state shown by FIGS. 13a-13c, the detent elements 12 of the first group 12a have also been removed from the detent openings 11 of the second group 11a. The extension module 4 is completely removed from the adapter element 9.

FIGS. 14a, 14b, 14c, 14d to 18a, 18b, 18c, 18d show a further embodiment of the snap-in connection. FIGS. 14a, 14b, 14c, 14d show an end position in which the extension module 4 is arranged on the adapter element 9. FIG. 14b shows a side view and FIG. 14d a view from the rear side 8. FIG. 14a shows a top view from below and FIG. 14c a top view from above. Section A:A shows the shape of the adapter element 9 with a detent element 12. FIGS. 15a-15d show an alternative end position in which the detent elements 12 are in the opposite detent sections 16. The description of these figures is otherwise analogous to FIGS. 14a-14d. In contrast to the embodiment according to FIGS. 10a, 10b, 10c to 13a, 13b, 13c, in this embodiment the detent openings 11 and the detent elements 12 have different configurations. In all other respects, the embodiments shown are analogous. The detent openings 11 of the first group 11a as well as of the second group 11b are essentially T-shaped. The detent openings 11 thus comprise a substantially rectangular insertion area 15, to which two detent areas 16 are adjacent.

The two detent areas 16 extend along the longitudinal axis X in opposite directions. Both detent areas 16 adjoin the insertion area 15 by means of a transition area 17, which comprises a narrowing 17a. This is clearly visible in magnification F. The detent elements 12 of the second group 12b are hook-shaped. They comprise a pin-shaped section 13, on which an elongated securing section 14 is arranged at an angle β. The detent elements 12 of the first group 12a comprise a pin-shaped section 13 and a securing section 14 which has substantially the same shape as the pin-shaped section 13. The extension module 4 shown is arranged on the adapter element 9 by means of two pairs of detent elements 12c, each of which engages in a pair of detent openings 11c. In the enlargement C it is clearly visible that the securing section 14 rests against an inner wall 36 of the adapter element 9 and thus secures the extension module 4.

FIGS. 16a-16d, 17a-17d and 18a-18d show the step-by-step process of removing the extension module 4. These FIGS. 16a-16d, 17a-17d and 18a-18d otherwise correspond to FIGS. 14a-14d or 15a-15d. A description of the similar elements, as well as the different views, is therefore omitted. In FIGS. 16a-16d, the detent elements 12 in the detent openings 11 have been moved from the detent area 16 to the insertion area 15 via the transition area 17. A greater force had to be applied to overcome the narrowing 17a. In the condition shown by FIGS. 17a-17d, the detent elements 12 of the second group 12b have already been removed from the detent openings 11 of the second group 11b. Due to a more elongated dimension of the insertion areas 15 of the detent openings 11 of the first group 11a, the detent elements 12 of the first group 12a are still located in the corresponding insertion areas 15. In the state shown by FIGS. 18a-18d, the detent elements 12 of the first group 12a have also been removed from the detent openings 11 of the second group 11a. The extension module 4 is completely removed from the adapter element 9.

A further extension module 26 can also be arranged on the front side 7 and/or on the rear side 8 of the base body 2, wherein the further extension module 26 is an active extension module 26, a passive extension module 26 or a combination of an active and a passive extension module 26.

For this purpose, a third connection interface 27 of predetermined design is provided, which is arranged or formed on the front side 7 and/or the rear side 8 of the base body 2. The at least one further extension module 26 has a fourth connection interface 28 of predetermined design which is compatible with the third connection interface 27. At least one positive connection is provided between the third connection interface 27 and the fourth connection interface 28. A first positive connection in the form of a fitting connection is provided between the third connection interface 27 and the second connection interface 28. The fitting connection comprises a connection interface 27, 28 configured as a receptacle 37. In the embodiments shown, the fourth connection interface 28 is configured as a receptacle 37. Furthermore, the third connection interface 27 is designed as a connecting section 38. The connecting section 38 can be pushed into the receptacle 37 and is received by it. The first connection interface 27 and the second connection interface 28 are thus compatible. The third connection interface 27 is formed integrally or in one piece by the base body 2. Likewise, the fourth connection interface 28 is integrally or one-piece formed by the extension module 4. However, it would also be conceivable for the first connection interface 27 and/or the fourth connection interface 28 to be provided on an adapter element 9. The adapter element 9 could then be arranged on the base body 2 or the extension module 4.

In a third connection interface 27, which is arranged on the front side 7 of the base body 2, the connecting section 38 is essentially rectangular in shape. Of course, other shapes such as a triangular shape or any other polygonal shape would also be conceivable. The connecting section comprises two first side walls 35 spaced along the width axis Y, which extend along the longitudinal axis X and the height axis Z. The first side wall 35 extends along the longitudinal axis X and the height axis Z, respectively. A second side wall, which extends substantially along the width axis Y and the height axis Z, connects the two first side walls. The two first side walls and the second side wall are arranged on a plate-like element, or are formed integrally or in one piece therewith. In a fourth connection interface 28 compatible with this third connection interface 27, the receptacle 37 is also substantially rectangular in shape and comprises two first side walls which extend along the longitudinal axis X and the height axis Z. Furthermore, a second side wall integrated into the further extension module 26 is provided (not visible in the views), which extends along the width axis Y and the height axis Z and connects the two first side walls. The receptacle 37 also comprises at least the two first side walls and a second side wall. Preferably, side walls are integrally or one-piece formed through the receptacle 37. Furthermore, a guide connection 39 is provided between the third connection interface 27 and the second connection interface 28. This guide connection 39 comprises a pin element and a receptacle 37. In the case of a third connection interface 27, which is arranged on the front side 7 of the base body 2, the receptacle 37 is provided in the second side wall of the connecting section 38. The receptacle 37 is arranged substantially centrally along the width axis Y. The pin element is provided on the second side wall of the fourth connection interface 28. When the further extension module 26 is pushed onto the base body 2, the connecting section 38 enters the receptacle 37. The guide connection 39 correctly positions the connecting section 38 relative to the receptacle 37. The guide connection 39 thus facilitates the assembly of a corresponding further extension module 26. In an end position, the plate-like element of the connecting section 38 lies against the plate-like element of the receptacle 37, wherein the plate-like element of the connecting section 38 lies along the height axis Z above the plate-like element of the receptacle 37. Further, the first side walls of the connecting section 38 abut the first side walls of the receptacle 37, wherein the first side walls of the connecting section 38 lie within (i.e. closer to an imaginary centre line) the first side walls of the receptacle 37 along the width axis Y. The first side walls of the connecting section 38 and the first side walls of the receptacle 37 each have aligned holes 34, which enable a positive connection. These holes 34 are preferably threaded so that a screw can be screwed in. This positive connection secures the further extension module 26 to the base body 2. A third connection interface 27, which is provided on the rear side 8 of the base body 2, is formed as a connecting section 38. The connecting section 38 comprises first side walls which are integrated in the base body 2. The compatible fourth connection interface 28 also comprises first side walls. These side walls extend forward along the longitudinal axis X. The receptacle 37 is substantially trapezoidal or parabolic in shape. Here too, the first side walls of the receptacle 37 embrace the first side walls of the connecting section 38 when the further extension module 26 is guided onto the base body 2. A guide connection 39 with a pin element and a receptacle 37 is also provided, the pin element being arranged in the fourth connection interface 28 designed as a receptacle 37.

An alternative design of the third connection interface 27 and the fourth connection interface 28 is shown in FIG. 14*c* in section D:D and magnification E. The third and fourth connection interfaces 27, 28 each comprise interlocking hook elements. The further extension module 26 can additionally be fastened to the base body 2 by a positive connection, for example a screw connection.

The at least one extension module 4 or the at least one further extension module 26 may be an active extension module 4, 26 a passive extension module 4, 26 or a combination of an active and a passive extension module 4, 26. An active extension module 4, 26 may be an input and/or output device 18, a joystick 19, a steering wheel, a push-button and/or switching element 20, a touch screen 21, a display device 22 or a combination of the aforementioned elements. A passive extension module 4, 26 may be a storage element 23, a holder element 24, for example a cup holder, a hook element 25, a bag, a net, an ashtray, an extra pad or combinations of the aforementioned elements. FIG. 1 shows some of these active and passive extension modules 4, 26.

The at least one extension module 4 and/or the at least one further extension module 26 can be designed in such a way that at least one additional extension module 40 can be arranged thereon. For this purpose, openings and/or projections can be provided, for example, which enable a non-positive connection, for example a clamp connection, with an additional extension module 40. Accordingly, the at least one extension module 4 and/or the at least one further extension module 26 are or comprise a fifth connection interface 42. Thus, many common extension modules 4 can be indirectly attached to the base body 2 by means of a non-positive connection. FIG. 3*d* shows, for example, an additional extension module 40 in the form of a holder for a smartphone. This holder is force-fitted in a further extension module 26 in the form of a holder element 24 by means of a clamping connection against the inner wall of the holder element 24. FIG. 1 also shows an extension module 4, which is designed as an adapter module 41. The adapter module 41 comprises a front side with various holes 34, which are equipped with an internal thread. By means of these holes 34, various other elements can be attached to the adapter module 41.

FIGS. 2*a* to 8*e* show various combinations of extension modules 4 and further extension modules 24 in different views.

Figure 3A:
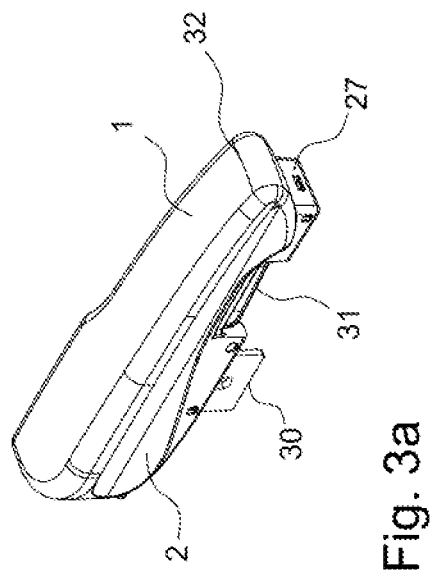
FIG. 3a an armrest element according to an embodiment.
Figure 3C:
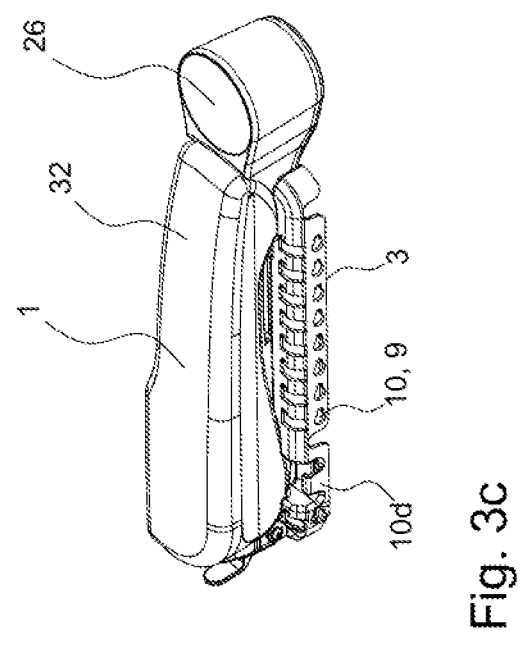
FIG. 3c an armrest element according to an embodiment.
Figure 4E:
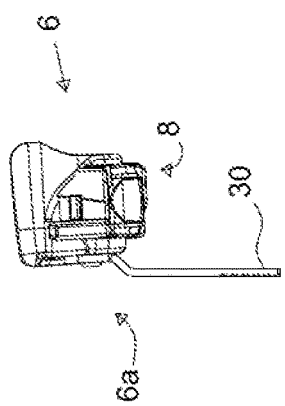
FIG. 4a-4e different views of an armrest element according to an embodiment.
Figure 4B:
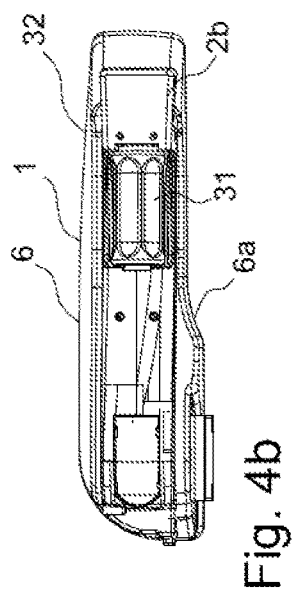
Figure 4A:
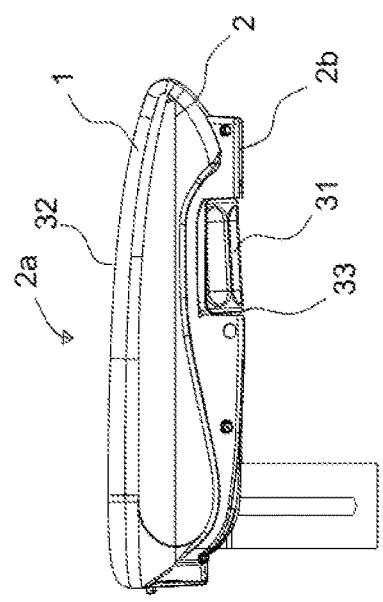
Figure 4C:
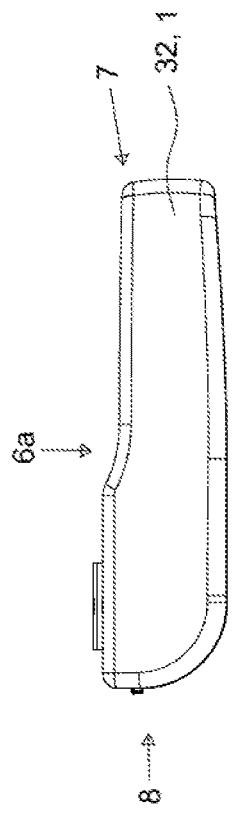
Figure 4D:
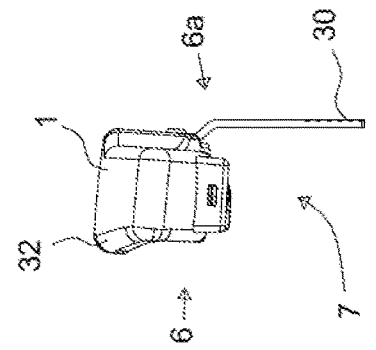

FIG. 3*a* shows a perspective view of an armrest element 1 with a third connection interface 27. FIGS. 4*a* to 4*e* show further views of such an armrest element 1. FIG. 4*a* is a side view, FIG. 4*b* a bottom view, FIG. 4*c* a top view, FIG. 4*d* a front view and FIG. 4*e* a rear view. FIG. 3*b* shows a perspective view of an armrest element 1 with a first connection interface 3 comprising an adapter element 9.

FIG. 3c is a perspective view of an armrest element 1 with a further extension module 26 in the form of a cup holder or holder element 24, which is arranged on the front side 7 of the base body 2 by means of third and fourth connection interfaces 27, 28. A further extension module 26 in the form of a hook element 25 is arranged on the rear side 8 of the base body 2 by means of third and fourth connection interfaces 27, 28. FIGS. 5a to 5e show further views of such an armrest element 1. FIG. 5a is a side view, FIG. 5b a bottom view, FIG. 5c a top view, FIG. 5d a front view and FIG. 5e a rear view.

FIGS. 6a to 6e show views of an armrest element 1 on which two extension modules 4 in the form of storage elements 23 are arranged. The two extension modules 4 each have a second connection interface 5 which is arranged on the first connection interface 3 with an adapter element 9. Further extension modules 26 are also arranged on the front side 7 and on the rear side 8. The third 27 and fourth connection interfaces 28 are connected for this purpose. A hook element 25 is arranged on the rear side 8 and a cup holder on the front side 7. FIG. 6a is a side view, FIG. 6b a bottom view, FIG. 6c a top view, FIG. 6d a front view and FIG. 6e a rear view. FIGS. 7a to 7e show views of an armrest element 1 which is substantially the same as the armrest element 1 shown in FIGS. 6a to 6e. However, no further extension modules 26 are provided. FIG. 7a is a side view, FIG. 7b a bottom view, FIG. 7c a top view, FIG. 7d a front view and FIG. 7e a rear view. FIGS. 8a to 8e show views of an armrest element 1 which is essentially the same as the armrest element 1 shown in FIGS. 6a to 6e. However, instead of two extension modules 4 in the form of storage elements 23, one extension module 4 in the form of an elongated storage element 23 is provided. FIG. 8a is a side view, FIG. 8b a bottom view, FIG. 8c a top view, FIG. 8d a front view and FIG. 8e a rear view. FIGS. 9a to 9e show only the two extension modules 4 in the form of storage elements 23 and the adapter element 9. FIG. 9a is a side view, FIG. 9b a bottom view, FIG. 9c a top view, FIG. 9d a front view and FIG. 9e a rear view.

All features disclosed in the application documents are claimed as essential to the invention, provided that they are individually or in combination new compared to the prior art.

LIST OF REFERENCE SIGNS

1 Armrest element
2 Base body
2a Upper side of the base body
2b Lower side of the base body
3 First connection interface
4 Extension module
5 second connection interface
6 outer long side
6a inner long side
7 Front side
8 Rear side
9 Adapter element
10 Strip-shaped element
10a first section of the strip-shaped element
10b second section of the strip-shaped element
10c Transition section of strip-shaped element
10d Hook element
11 Detent opening
11a first group of detent openings
11b second group of detent openings
11c Pair of detent openings
12 Detent element
12a first group of detent elements
12b second group of detent elements
12c Pair of detent elements
13 first pin-shaped section
14 Securing section
15 Insertion area of the detent opening
16 Detent area of the detent opening
17 Transition area of the detent opening
17a Narrowing
18 Input and/or output device
19 Joystick
20 Pushbutton and/or switching element
21 Touch screen
22 Display device
23 Storage element
24 Holder element
25 Hook element
26 Further extension module
27 Third connection interface
28 Fourth connection interface
29 Additional extension module
30 Fastening element
31 Operating element
32 Support element
33 Base body recess
34 Hole
35 Side wall
36 inner wall of the adapter element
37 Receptacle
38 Connecting section
39 Guide connection
40 Additional extension module
41 Adapter module
42 fifth connection interface
100 Seat
X Longitudinal axis
Y Width axis
Z Height axis

What is claimed is:

1. A vehicle seat with an armrest element, comprising:
a base body, the base body including:
an outer long side extending along a longitudinal axis;
an inner long side that faces an occupant in the vehicle seat;
a front side extending along a width axis direction; and
a rear side extending along the width axis direction, wherein the outer long side is spaced from the inner long side along the width axis direction;
a first connection interface on the long side of the base body, wherein at least one exchangeable extension module having a second connection interface can be fixed to the first connection interface, and wherein the first connection interface and the second connection interface are designed in such a way that at least one detent connection is made possible between the first connection interface and the second connection interface,
wherein the first connection interface is designed as an adapter element, which is arranged on the base body,
wherein the adapter element is arranged on the base body by means of at least one positive connection,
wherein the adapter element is designed as a strip-shaped element,
wherein the strip-shaped element includes a first section and a second section, wherein the first section and the second section enclose an angle α, wherein the angle α is less than 180°, wherein the first connection interface comprises a plurality of detent openings, wherein a first group of detent openings is provided on the first section of the strip-shaped element, wherein a second group of detent openings is provided on the second section of the strip-shaped element, and wherein a member of the first group of detent openings and a member of the second group of detent openings each form a pair of detent openings and have a predetermined alignment with each other.

2. The vehicle seat according to claim 1, wherein at least one detent element is provided as part of the second connection interface, wherein the at least one detent element engages at least one of the detent openings.

3. The vehicle seat according to claim 2, wherein the at least one detent element has a first section in the form of a pin and a securing section arranged thereon.

4. The vehicle seat according to claim 3, wherein the detent openings have an insertion area and at least one detent area, the insertion area being dimensioned such that the securing section of a detent element can be passed through it, the detent area having a reduced opening in comparison with the insertion area, which opening can receive the first pin-shaped section of a detent element.

5. The vehicle seat according to claim 4, wherein between the insertion area of the detent opening and the detent area of the detent opening a transition area is provided with a narrowing that secures the first section of a detent element in the detent area of the detent opening.

6. The vehicle seat according to claim 1, wherein the second connection interface comprises at least one first group of detent elements and at least one second group of detent elements, wherein a member of the first group of detent elements and a member of the second group of detent elements each form a pair of detent elements and have a predetermined alignment with respect to each other, and wherein a pair of detent elements is compatible with a pair of detent openings.

7. The vehicle seat according to claim 1, wherein the at least one extension module is or comprises an active extension module, wherein the active extension module is selected from the group comprising: an input and/or output device, a joystick, a steering wheel, a pushbutton and/or switching element, a touch screen, a display device or combinations of the aforementioned elements.

8. The vehicle seat according to claim 1, wherein the at least one extension module is or comprises a passive extension module, the passive extension module being selected from the group comprising: a storage element, a holder element, a hook element, a pocket, a net, an ashtray, a pad or combinations of the aforementioned elements.

9. The vehicle seat according to claim 1, wherein a further extension module is arranged on the front side and/or on the rear side of the base body, and wherein the further extension module is an active extension module, a passive extension module or a combination of an active and a passive extension module.

10. The vehicle seat according to claim 9, wherein a third connection interface of predetermined design is provided that is arranged or formed on the front side and/or the rear side of the base body, the at least one further extension module having a fourth connection interface of predetermined design that is compatible with the third connection interface, and wherein at least one positive connection is provided between the third connection interface and the fourth connection interface.

11. The vehicle seat according to claim 10, wherein the at least one extension module and/or the at least one further extension module is configured in such a way that at least an additional extension module can be arranged thereon.

12. The vehicle seat according to claim 1, further comprising:

an inclination adjustment device by means of which the tilt of the armrest element relative to the seat can be adjusted, wherein the inclination adjustment device can be operated with an operating element in the form of a rotatably arranged cylinder element, wherein this operating element is arranged in a recess of an underside of the base body.

* * * * *